(12) United States Patent
Kanaya

(10) Patent No.: US 12,239,906 B2
(45) Date of Patent: *Mar. 4, 2025

(54) VIDEO MODIFICATION AND TRANSMISSION

(71) Applicant: GREE, Inc., Tokyo (JP)

(72) Inventor: Yosuke Kanaya, Tokyo (JP)

(73) Assignee: GREE, INC., Tokyo (JP)

( * ) Notice: Subject to any disclaimer, the term of this patent is extended or adjusted under 35 U.S.C. 154(b) by 206 days.

This patent is subject to a terminal disclaimer.

(21) Appl. No.: 18/084,435

(22) Filed: Dec. 19, 2022

(65) Prior Publication Data

US 2023/0130306 A1    Apr. 27, 2023

Related U.S. Application Data

(63) Continuation of application No. 17/352,050, filed on Jun. 18, 2021, now Pat. No. 11,583,767.

(30) Foreign Application Priority Data

Jun. 23, 2020  (JP) .................................. 2020-108092
Jul. 17, 2020  (JP) .................................. 2020-122731

(51) Int. Cl.
*A63F 13/00*    (2014.01)
*A63F 13/213*   (2014.01)
(Continued)

(52) U.S. Cl.
CPC .......... *A63F 13/355* (2014.09); *A63F 13/213* (2014.09); *A63F 13/428* (2014.09);
(Continued)

(58) Field of Classification Search
CPC ............. G07F 17/3225; G07F 17/3239; G07F 17/3272
See application file for complete search history.

(56) References Cited

U.S. PATENT DOCUMENTS 5,393,072 A *  2/1995  Best ..................... G11B 27/105
6,966,837 B1 * 11/2005  Best ......................... A63F 13/52
                                                          463/32

(Continued)

FOREIGN PATENT DOCUMENTS

JP    2017-188833 A    10/2017
JP    2018-005320 A     1/2018
(Continued)

OTHER PUBLICATIONS

Mirrativ, Inc., "Game distribution & game commentary & game recording," downloaded from https://apps.apple.com/jp/app/mirrativ-ミラティブ-スマホでかんたんゲーム配信/id1028944599, 7 pp., Nov. 10, 2020 (English translation attached.).

(Continued)

*Primary Examiner* — David L Lewis
*Assistant Examiner* — Eric M Thomas
(74) *Attorney, Agent, or Firm* — Oliff PLC

(57) ABSTRACT

Methods and apparatus are disclosed for video transmission. According to one example, computer-readable storage media storing computer-readable instructions, which when executed by a computer having at least one processor, cause the computer to: change, during or after execution of a computer-implemented game, at least one current parameter of an avatar of a first distributor on the basis of second data or display in a second video, during or after execution of the computer-implemented game, an avatar of the first distributor and an avatar of at least any user of one or more users on the basis of the second data, wherein first data is data regarding at least any of the following: one or more users who jointly distributed a computer-implemented game with the first distributor, and one or more users who jointly (Continued)

distributed with the first distributor using an avatar of the first distributor and his/her own avatar.

20 Claims, 10 Drawing Sheets

(51) Int. Cl.
    *A63F 13/355*     (2014.01)
    *A63F 13/428*     (2014.01)
    *A63F 13/45*     (2014.01)
    *A63F 13/69*     (2014.01)
    *A63F 13/87*     (2014.01)
    *A63F 13/92*     (2014.01)

(52) U.S. Cl.
    CPC .............. *A63F 13/45* (2014.09); *A63F 13/69* (2014.09); *A63F 13/87* (2014.09); *A63F 13/92* (2014.09); *A63F 2300/5553* (2013.01)

(56) References Cited

U.S. PATENT DOCUMENTS

| | | | |
|---|---|---|---|
| 10,255,765 B2 * | 4/2019 | Washington | G07F 17/3239 |
| 10,345,897 B2 | 7/2019 | Verfaillie et al. | |
| 10,376,795 B2 | 8/2019 | Garg et al. | |
| 10,390,064 B2 | 8/2019 | Dury et al. | |
| 10,484,439 B2 | 11/2019 | Oates, III | |
| 10,632,372 B2 | 4/2020 | Gilmore et al. | |
| 10,905,953 B2 | 2/2021 | Kim et al. | |
| 11,071,919 B2 | 7/2021 | Willette et al. | |
| 11,583,767 B2 | 2/2023 | Kanaya | |
| 2017/0001122 A1 | 1/2017 | Leung et al. | |
| 2019/0009178 A1 | 1/2019 | Nakagawa et al. | |
| 2019/0349625 A1 | 11/2019 | Watanabe et al. | |
| 2021/0121778 A1 | 4/2021 | Kim et al. | |
| 2021/0394052 A1 | 12/2021 | Kanaya | |

FOREIGN PATENT DOCUMENTS

| | | |
|---|---|---|
| JP | 2018-520772 A | 8/2018 |
| JP | 6382468 B1 | 8/2018 |
| JP | 2019-195536 A | 11/2019 |
| JP | 2019-204224 A | 11/2019 |
| JP | 2020-044136 A | 3/2020 |

OTHER PUBLICATIONS

Office Action issued in JP 2020-108092, dated Dec. 15, 2020, with English Machine Translation, 5 pages.
Office Action issued in JP 2020-108092, dated Mar. 16, 2021, with English Machine Translation, 3 pages.
Office Action issued in JP 2020-122731, dated Dec. 22, 2020, with English Translation, 9 pages.
Office Action issued in JP 2020-122731, dated May 11, 2021, with English Translation, 8 pages.

\* cited by examiner

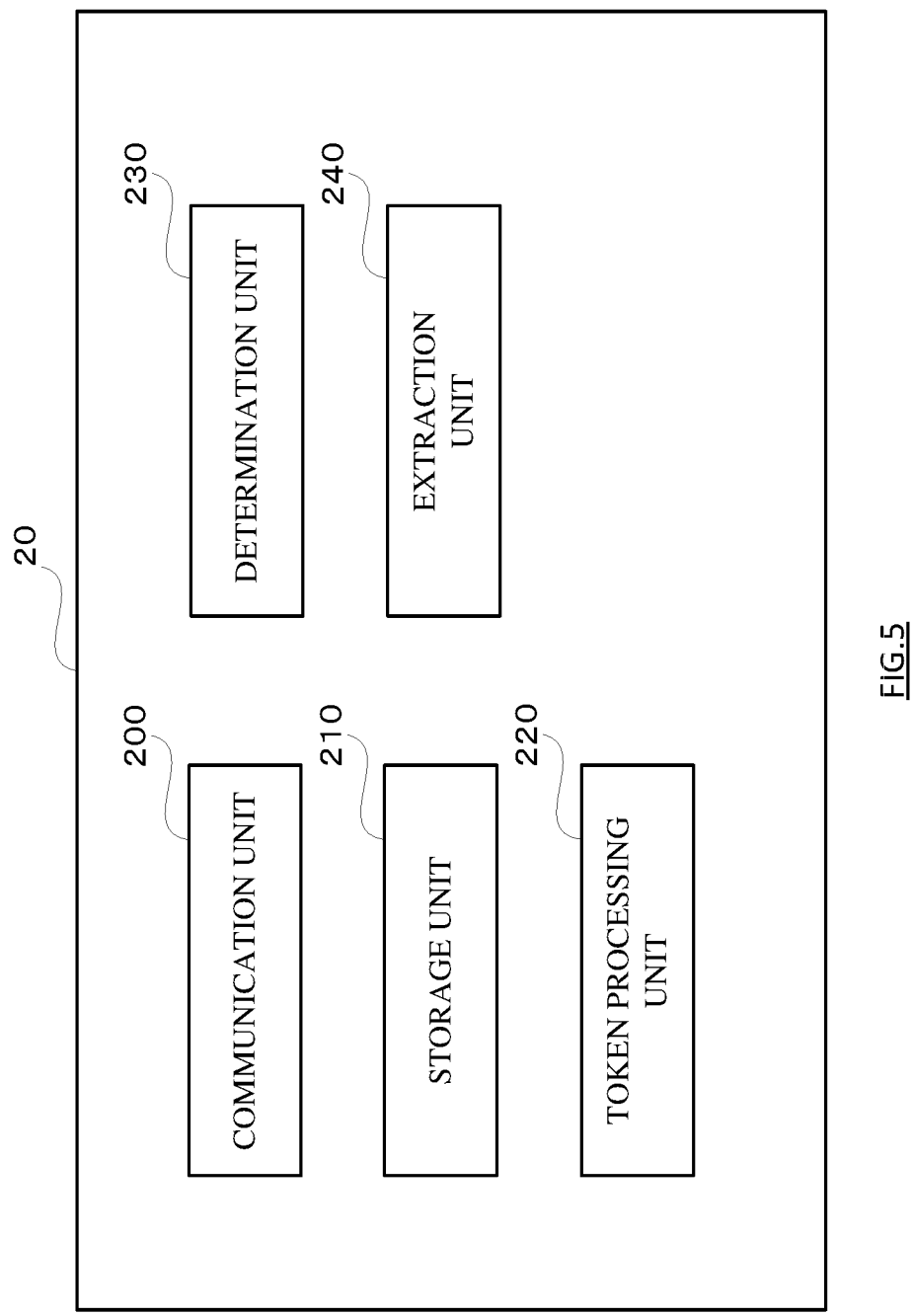

VIDEO MODIFICATION AND TRANSMISSION

CROSS-REFERENCE TO RELATED APPLICATIONS

This application is a continuation of U.S. application Ser. No. 17/352,050, filed Jun. 18, 2021, which claims priority to Japanese Patent Application No. 2020-108092, filed on Jun. 23, 2020; and Japanese Patent Application No. 2020-122731, filed on Jul. 17, 2020, all entitled "Computer Program, Method, and Server Device." These applications are incorporated herein by reference in their entirety as if set forth fully herein.

FIELD

The technology disclosed in the present application relates to a computer program, a method, and a server device that are used for distributing a video related to a game from a terminal device of a distributor to a terminal device of each viewer.

BACKGROUND

As one example of a service used for distributing a video related to a computer game from the terminal device of a distributor to the terminal device of each viewer, a service called mirrativ provided on a website identified by the following URL is known.
  https://apps.apple.com/jp/app/mirrativ-ミラティブ-スマホでかんたんゲーム配信

With this service, the distributor uses a terminal device to distribute, to the terminal devices of a plurality of viewers, a video including an animation of an avatar generated on the basis of motion data related to the motion of the distributor and a video related to a computer-implemented game generated on the basis of operation data related to the operation of the distributor.

SUMMARY

Assuming a video in which avatars of a plurality of distributors (e.g., a first distributor and a second distributor) perform together is distributed or a video in which the plurality of distributors jointly perform a game is distributed, in a case where the first distributor and the second distributor jointly distribute, the number of viewers may increase compared with a case where the first distributor distributes. In this case, in a case where the second distributor who jointly performs distribution with the first distributor stops and leaves the distribution, the number of viewers may decrease due to the influence of the fact that the second distributor left and spoiling the amusement of the game to be distributed later by the first distributor may be possibly caused. Thus, even if the second distributor performing distribution with the first distributor stopped and left the distribution, it is desirable to have a configuration that does not spoil the amusement of the game to be distributed later by the first distributor as much as possible.

Accordingly, the technique disclosed in the present disclosure provides a computer program, a method, and a server device which reduce the possibility of spoiling the amusement of the game. In the disclosed technology field, such tokens may also be referred to as elective tokens or "gifts." Similarly, token data may be referred to as "gift data."

Computer-readable storage media according to another aspect of the disclosed technology can be "a computer-readable storage media storing computer-readable instructions, which when executed by a computer having at least one processor, cause the computer to: distribute a first video and a second video toward a viewer terminal of at least one viewer via a communication line, the first video including either video generated with motion data regarding a motion of a first distributor or an animation of an avatar of the first distributor generated on the basis of the motion data, the second video regarding a computer-implemented game generated on the basis of operation data regarding an operation of the first distributor using a received web page; store first data in a computer-readable medium regarding one or more users having performed collaborative distribution with the first distributor prior to execution of the computer-implemented game; determine whether or not a first condition is satisfied after the first distributor and the one or more users perform the collaborative distribution; extract second data regarding at least any user of the one or more users on the basis of the first data in a case where the first condition is satisfied; and change, during or after execution of the computer-implemented game, at least one current parameter of an avatar of the first distributor on the basis of the second data or display in the second video, during or after execution of the computer-implemented game, an avatar of the first distributor and an avatar of at least any user of the one or more users on the basis of the second data, wherein the first data is data regarding at least any of the following: one or more users who jointly distributed a computer-implemented game with the first distributor, and one or more users who jointly distributed with the first distributor using an avatar of the first distributor and his/her own avatar."

A method according to one aspect of the disclosed technology can be "a computer-implemented method for automatically generating customized video in an interactive network application, the method comprising: with at least one processor: distributing a first video and a second video toward a viewer terminal of at least one viewer via a communication line, the first video including either video generated with motion data regarding a motion of a first distributor or an animation of an avatar of the first distributor generated on the basis of the motion data, the second video regarding a computer-implemented game generated on the basis of operation data regarding an operation of the first distributor using a received web page; storing first data regarding one or more users having performed collaborative distribution with the first distributor prior to execution of the computer-implemented game; determining whether or not a first condition is satisfied after the first distributor and the one or more users perform the collaborative distribution; extracting second data regarding at least any user of the one or more users on the basis of the first data in a case where the first condition is satisfied; and changing, during or after execution of the computer-implemented game, at least one current parameter of an avatar of the first distributor on the basis of the second data or displaying in the second video, during or after execution of the computer-implemented game, an avatar of the first distributor and an avatar of at least any user of the one or more users on the basis of the second data, wherein the first data is data regarding at least any of the following: one or more users who jointly distributed a computer-implemented game with the first distributor, and one or more users who jointly distributed with the first distributor using an avatar of the first distributor and his/her own avatar."

A terminal device according to one aspect of the disclosed technology can be "a terminal device, comprising: at least one processor coupled to a communication line, wherein the at least one processor is configured to: receive a first video and a second video from a distributor terminal of a first distributor via a communication line, the first video including either motion data regarding a motion of the first distributor, the motion data being produced with a camera, or an animation of an avatar of the first distributor generated on the basis of the motion data, the second video regarding a computer-implemented game generated on the basis of operation data regarding an operation of the first distributor using a received web page, wherein first data regarding one or more users having performed collaborative distribution with the first distributor prior to execution of the computer-implemented game is stored, wherein it is determined whether or not a first condition is satisfied after the first distributor and the one or more users perform the collaborative distribution, wherein second data regarding at least any user of the one or more users on the basis of the first data is extracted in a case where the first condition is satisfied, wherein at least one current parameter of an avatar of the first distributor is changed, during or after execution of the computer-implemented game, on the basis of the second data or an avatar of the first distributor and an avatar of at least any user of the one or more users are displayed in the second video, during or after execution of the computer-implemented game, on the basis of the second data, and wherein the at least one processor is further configured to: display the second video including an avatar of the first distributor and an avatar of the at least any user, wherein the first data is data regarding at least any of the following: one or more users who jointly distributed a computer-implemented game with the first distributor, and one or more users who jointly distributed with the first distributor using an avatar of the first distributor and his/her own avatar"

A system according to one aspect of the disclosed technology can be "a system, comprising: the terminal device; and a server device coupled to the distributor terminal via the communication line, wherein the server is configured to transmit the second video to the terminal device."

This Summary is provided to introduce a selection of concepts in a simplified form that are further described below in the Detailed Description. All trademarks used herein remain the property of their respective owners. This Summary is not intended to identify key features or essential features of the claimed subject matter, nor is it intended to be used to limit the scope of the claimed subject matter. The foregoing and other objects, features, and advantages of the disclosed subject matter will become more apparent from the following Detailed Description, which proceeds with reference to the accompanying figures.

BRIEF DESCRIPTION OF DRAWINGS

FIG. 5 is a block diagram schematically showing an example of the function of the server device 20 shown in FIG. 1.

DETAILED DESCRIPTION

Figure 1:
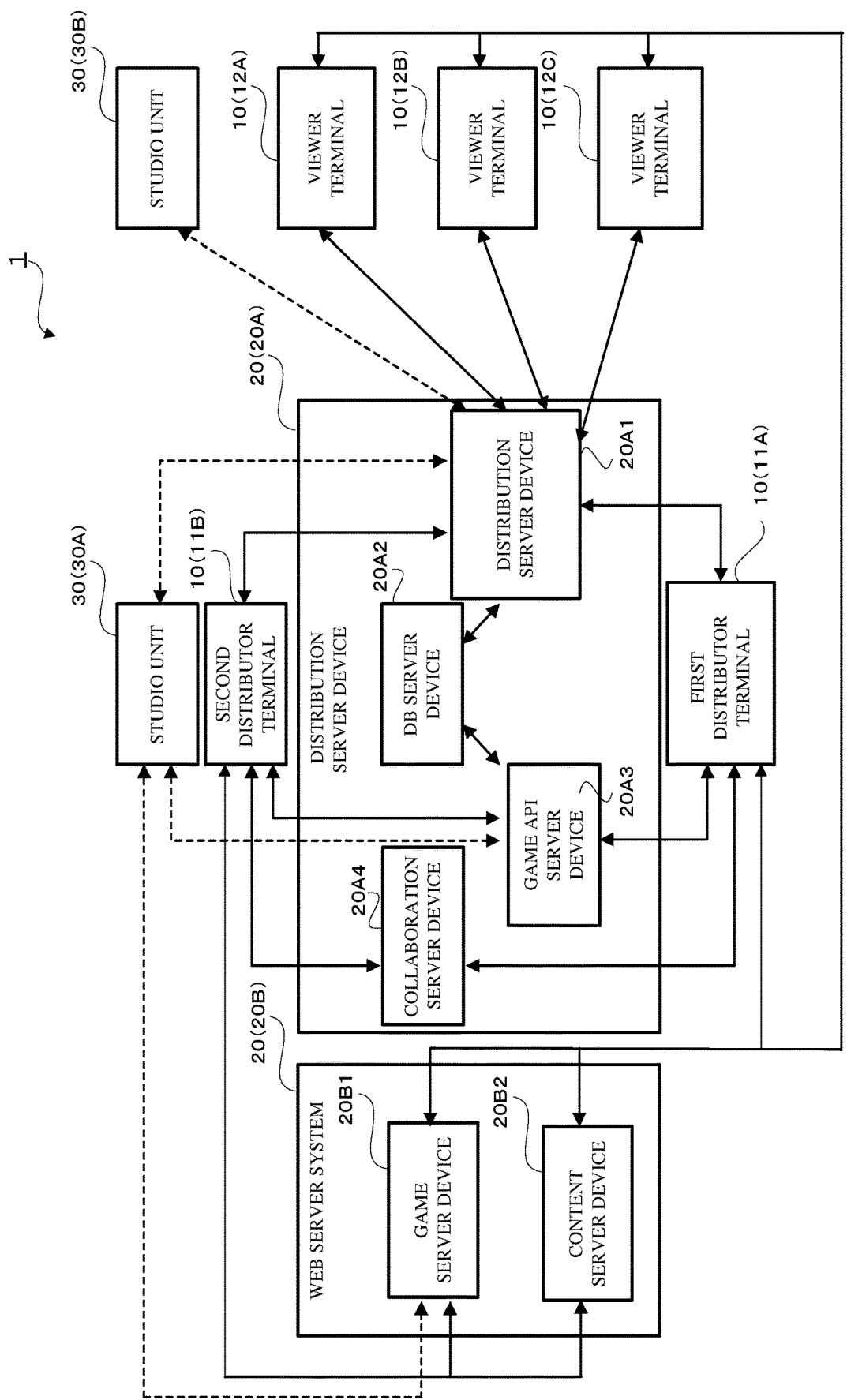
FIG. 1 is a block diagram showing an example of a configuration of a video distribution system 1 according to an embodiment.

This disclosure is set forth in the context of representative embodiments that are not intended to be limiting in any way. As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "evaluate," and "distribute" to describe the disclosed methods. These terms are high-level descriptions of the actual operations that are performed. The actual operations that correspond to these terms will vary depending on the particular implementation and are readily discernible by one of ordinary skill in the art having the benefit of the present disclosure.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented using computer-executable instructions stored on one or more computer-readable media (e.g., non-transitory computer-readable storage media, such as one or more optical media discs, volatile memory components (such as DRAM or SRAM), or nonvolatile memory components (such as hard drives and solid state drives (SSDs))) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable storage media). The computer-executable instructions can be part of, for example, a dedicated software application, or a software application that is accessed or downloaded via a web browser or other software application (such as a remote computing application). Such software can be executed, for example, on a single local computer (e.g., as an agent executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Various embodiments of the present invention will hereinafter be described with reference to the accompanying drawings. Incidentally, identical reference numerals are given to common components in the drawings. It should be noted that a component represented in a certain figure may be omitted in another figure for convenience of explanation. It should be further noted that the accompanying drawings are not necessarily to scale.

1. Configuration of Video Distribution System

In short, the video distribution system of the present disclosure enables a user (hereinafter referred to as a "distributor") performing distribution to distribute, using his/her terminal, a first video including either video generated with motion data regarding a motion of this distributor or an animation of an avatar (avatar object) generated based on motion data regarding the motion of this distributor and a second video regarding a game (a computer-implemented game) generated on the basis of operation data regarding the operation of this distributor to a terminal of a user (hereinafter referred to as a "viewer") viewing the video via a communication line. A server at the distributor, or the distributor terminal device itself, can process the data to render modified video data that is encoded by a video encoder and sent to the viewer terminal device. The video encoder comprises a processor (e.g., a central processing unit or a graphics processing unit) configured to generate video files or streams according to one or more video coding formats. Example of suitable video coding formats include but are not limited to: H.264, H.265, VC-1, MPEG-1, MPEG-2, and MPEG-4. A first example will hereinafter be described with reference to FIGS. 1 to 7B.

For example, the operation data can include one or more of the following: data indicative of how the distributor has swiped a touch pad display, data indicative of which object the distributer has tapped or clicked, or data indicative of how the distributor has dragged a touch pad display, or other such operation data.

FIG. 1 is a block diagram showing an example of the configuration of a video distribution system according to an embodiment. As shown in FIG. 1, the video distribution system 1 can include a plurality of terminals 10 connected to a communication line (communication network) not illustrated, and one or a plurality of server devices 20 connected to the communication line. Each terminal 10 can be connected to one or the plurality of server devices 20 via the communication line.

As the plurality of terminals 10, FIG. 1 shows, for example, a first distributor terminal 11A, a second distributor terminal 11B, a viewer terminal 12A, a viewer terminal 12B, and a viewer terminal 12C, but one or more terminals 10 other than them can be used similarly. In the following description, the first distributor terminal 11A and the second distributor terminal 11B shall sometimes be collectively referred to as a distributor terminal 11, and the viewer terminals 12A to 12C shall sometimes be collectively referred to as a viewer terminal 12. As one or the plurality of server devices 20, FIG. 1 shows, for example, a distribution server system 20A and a web server system 20B, but one or more server devices 20 other than them can be used similarly. The communication line (not shown) can include a mobile telephone network, a wireless network (e.g., RF connections via Bluetooth, WiFi (such as IEEE 802.11a/b/n), WiMax, cellular, satellite, laser, infrared), a fixed telephone network, the Internet, an intranet, a local area network (LAN), a wide-area network (WAN), and/or an Ethernet network, without being limited thereto. In a virtual host environment, the communication line(s) can be a virtualized network connection provided by the virtual host.

In an embodiment, the video distribution system 1 can include one or more studio units 30 connected to the communications network. Each studio unit 30 can be connected to one or the plurality of server devices 20 or the plurality of terminals 10 via the communication line. As one or more studio units 30, FIG. 1 shows, for example, studio units 30A and 30B, but one or more studio units 30 other than them can be used similarly. Each studio unit 30 can have a similar function to that of the terminal 10 or the server device 20 described later.

Hereinafter, in order to simplify the description, attention will be paid to a case where one or the plurality of server devices 20 transmit/receive a video or the like to/from each terminal 10. In place of this or in addition to this, as will be described later, it is also possible for one or the plurality of server devices 20 to transmit/receive a video or the like to/from each studio unit 30. Furthermore, in place of this or in addition to this, as will be described later, it is also possible for the studio unit 30 to transmit/receive a video or the like to/from each terminal 10.

1-1. Terminal 10

The plurality of terminals 10 can include, for example, the plurality of distributor terminals 11 (e.g., first distributor terminal 11A and second distributor terminal 11B) and one or more viewer terminals 12 (e.g., viewer terminals 12A to 12C). The distributor corresponding to the first distributor terminal 11A is referred to as a first distributor, and the distributor corresponding to the second distributor terminal 11B is referred to as a second distributor. In the following description, when the first distributor terminal 11A among the plurality of distributor terminals 11 independently distributes a game, the second distributor terminal 11B does not have to function as a terminal that distributes the game, and may be configured to function similarly to the viewer terminal 12, for example.

By having a common configuration, each terminal 10 can be any of a terminal (distributor terminal 11) for distributing a video and a terminal (viewer terminal 12) for viewing a video.

When operating as a terminal (distributor terminal) for distributing a video, by executing an installed video distribution application (may be middleware or a combination of an application and middleware. The same shall apply hereinafter), each terminal 10 can acquire motion data regarding the motion of the distributor, and can transmit, to the server device 20 (distribution server device 20A1) via the communication line, a first video including an animation of a virtual character (avatar/avatar object) changed according to the acquired data. Such first video is distributed to the terminal (viewer terminal) 12 for receiving the video via the communication line by the server device 20 (distribution server device 20A1). Such viewer terminal 12 can receive a video by executing an installed video viewing application (may be middleware or a combination of an application and middleware. The same shall apply hereinafter).

When operating as a distributor terminal, by executing a browser function incorporated in an installed video distribution application and/or by executing an installed web browser application, each terminal 10 can receive a web page (for example, an HTML document, including in some examples, HTML documents encoding executable code such as JavaScript or PHP code) from the server device 20 (web server system 20B) and execute a game program included in this web page. By executing this game program, each terminal 10 can generate a second video in which at least one game object is operated on the basis of operation data regarding the operation of the distributor. In independent distribution and/or collaborative distribution (to be described later), the user can start the browser by using his/her own terminal 10, receive game rendering data from the server device 20, and view the game via a game screen (Web View).

When operating as a distributor terminal, by executing the video distribution application, each terminal 10 can transmit the thus generated second video to the server device 20 (distribution server system 20A) via the communication line. Such second video is also distributed to the terminal (viewer terminal) 10 for receiving the video that executes the installed video viewing application via the communication line by the server device 20 (distribution server system 20A).

Furthermore, when operating as a distributor terminal, by executing the video distribution application, each terminal 10 can receive, via the server device 20 (distribution server system 20A) from the viewer terminal 12 viewing the second video (distributed by the distributor terminal 11), token data (gift data or gift information) indicating that a token (gift) is given to the distributor, and/or comment information (comment data) indicating that a comment is transmitted to the distributor.

On the other hand, when operating as a terminal (viewer terminal) for viewing a video, by executing the installed video viewing application, each terminal 10 can receive, via the server device 20 (distribution server system 20A), the first video and/or the second video distributed by the distributor terminal 11.

When operating as a viewer terminal, by executing the video viewing application, each terminal 10 can transmit, to the first distributor terminal 11A via the server device 20 (distribution server system 20A), token data (gift data or gift information) indicating that a token (gift) is given to a distributor, and/or comment information indicating that a comment is transmitted to the distributor.

The above-mentioned video distribution application and the video viewing application can be installed and executed in each terminal 10 as one integrated application or as separate applications.

Each terminal 10 is any terminal capable of executing such motion, and can include a smartphone, a tablet, a mobile phone (feature phone), and/or a personal computer, without limiting to them. Each terminal 10 is configured to be capable of performing, for example, collaborative distribution (joint or collaborative distribution).

In the following description, the collaborative distribution means, for example, a distribution performed jointly by a plurality of distributors using their own terminals. The collaborative distribution can include, for example, video distribution using the avatar of the first distributor and the avatar of another distributor, and game distribution performed by the first distributor and another distributor. The game distributed by the game distribution is, for example, a game (live game) distributed live. In the game distributed by the collaborative distribution, by inputting operation information (operation data) and/or voice to the terminal 10 owned by each user, the user distributing and/or viewing the game can transmit the input information (input data) to the terminal 10 operated by the other user, thereby allowing the users to communicate with each other.

In the case of performing collaborative distribution, for example, each of a plurality of distributors can be treated separately. For example, one distributor of the plurality of distributors can be treated as, for example, a host distributor, and the remaining of the plurality of distributors can be treated as, for example, a guest. Specifically, for example, when two distributors (first distributor and second distributor) execute collaborative distribution, the first distributor can be treated as a host distributor, and the second distributor can be treated as a guest. In this case, when the collaborative distribution is terminated, the first distributor continues the distribution, and the second distributor becomes impossible to continue the distribution. It can be configured so that the second distributor can view the distribution as a viewer, for example, in a case where the second distributor becomes impossible to continue the distribution.

When the plurality of distributors are treated separately, the display content displayed on the display screen of the terminal operated by the host distributor, for example, may be configured to be different from the display content displayed on the display screen of the terminal operated by the guest. When the plurality of distributors are treated separately, the number of commands operable by the host distributor, for example, may be configured to be larger than the number of commands operable by the guest.

An example in which a plurality of distributors are treated separately in the case of performing collaborative distribution has been described. However, the present invention is not limited to this example, and may be configured so that the plurality of distributors can be treated without being separated from each other in the case of performing collaborative distribution.

1-2. Server Device 20

As shown in FIG. 1, the server device 20 includes, for example, the distribution server system 20A and the web server system 20B.

The distribution server system 20A can distribute, to each terminal (each viewer terminal) 10, the first video and/or the second video transmitted by each terminal (each distributor terminal) 10. The distribution server system 20A can transmit, to the distributor terminal 11, token data (gift data or gift information) indicating that a token (gift) is given to a certain distributor and/or comment information indicating that a comment is to be transmitted to a certain distributor, transmitted by each terminal (each viewer terminal) 10.

In order to execute such a motion, the distribution server system 20A can, in an embodiment, include the distribution server device 20A1, a database (DB) server device 20A2, a game API server device 20A3, and a collaboration server device 20A4 that are connected to one another via the communication line (including a wireless line and/or a wired line not illustrated).

The distribution server device 20A1 can distribute, to each terminal 10, the first video and/or the second video transmitted by each distributor terminal 11. Furthermore, the distribution server device 20A1 can store, in the DB server device 20A2, the token data (gift data or gift information) and/or the comment information transmitted by each viewer terminal 12.

The DB server device 20A2 can store the token data (gift data or gift information) and/or the comment information received from the distribution server device 20A1, read the token data (gift data or gift information) and/or the comment information inquired by the game API server device 20A3, and transmit them to the game API server device 20A3.

When receiving an inquiry regarding token data (gift data or gift information) and/or comment information from each distributor terminal 11, the game API server device 20A3 can read the token data (gift data or gift information) and/or the comment information for the distributor terminal 11 from the DB server device 20A2, and transmit them to the distributor terminal 11. In order to decide a user to perform collaborative distribution, the game API server device 20A3 acquires information (data) of a candidate user other than the first distributor, and stores it in the DB server device 20A2. Here, the "candidate user other than the first distributor" is, for example, the second distributor or viewer.

The collaboration server device 20A4 communicates voice data and/or motion data with each terminal 10 during collaborative distribution, for example. In a case where the first distributor emits a voice to the first distributor terminal 11A during collaborative distribution, for example, the collaboration server device 20A4 receives data regarding the voice from the first distributor terminal 11A and transmits the data regarding the voice to the second distributor terminal 11B and/or the viewer terminal 12. In a case where the second distributor emits a voice to the second distributor terminal 11B during collaborative distribution, for example, the collaboration server device 20A4 receives data regarding the voice from the second distributor terminal 11B and transmits the data regarding the voice to the first distributor terminal 11A and/or the viewer terminal 12.

The example shown in FIG. 1 shows a configuration in which for the purpose of load dispersion and the like, the distribution server system 20A has four server devices having the distribution server device 20A1, the DB server device 20A2, the game API server device 20A3, and the collaboration server device 20A4. However, at least one server device of these four server devices may be integrated with at least one of the remaining server devices.

As shown in FIG. 1, the web server system 20B includes, for example, a game server device 20B1 and a content server device 20B2.

The game server device 20B1 transmits, to each distributor terminal 11 having accessed, a web page (document created according to HTML, for example, HTML5) in which a game program is incorporated. This game program can cause the received and decoded terminal 10 to execute various motions related to video distribution including the motions illustrated in (a) to (c) below.

(a) Motion of executing a game
(b) Motion of transmitting the game screen generated with the execution of the game to the distribution server system 20A (distribution server device 20A1)
(c) Motion of acquiring, from the distribution server system 20A (game API server device 20A3), token data (gift data or gift information) and/or comment information transmitted to the distributor When distributing a game by collaborative distribution, for example, the game server device 20B1 integrates operation information in the game, and performs calculation of a game logic. When distributing a game by collaborative distribution, for example, the game server device 20B1 transmits/receives game operation information and/or calculation information (calculation data) to/from the terminal 10 operated by a user distributing and/or viewing the game. The game server device 20B1 stores data regarding the second distributor and/or the viewer of the game distributed by the collaborative distribution during the collaborative distribution. The data stored in the game server device 20B1 can be used to decide the content of predetermined processing in S324 described later.

The content server device 20B2 is a device that stores, for example, game related data (e.g., live game content) and provides game rendering data to the terminal 10 operated by the user distributing and/or viewing the game.

1-3. Studio Unit 30

The studio unit 30 can be placed in a studio, a room, a hall, or the like that is a place where a performer (distributor) distributes a video. The studio unit 30 can perform the same function as that of the terminal 10 and/or the server device 20 as described above In FIG. 1, broken lines indicate that data can be communicated among the studio unit 30 and other devices, and solid lines indicate that data can be communicated among the other devices.

2. Hardware Configuration of Each Device

Next, an example of the hardware configuration of each of the terminal 10, the server device 20, and the studio unit 30 will be described.

2-1. Hardware Configuration of Terminal 10

Figure 2:
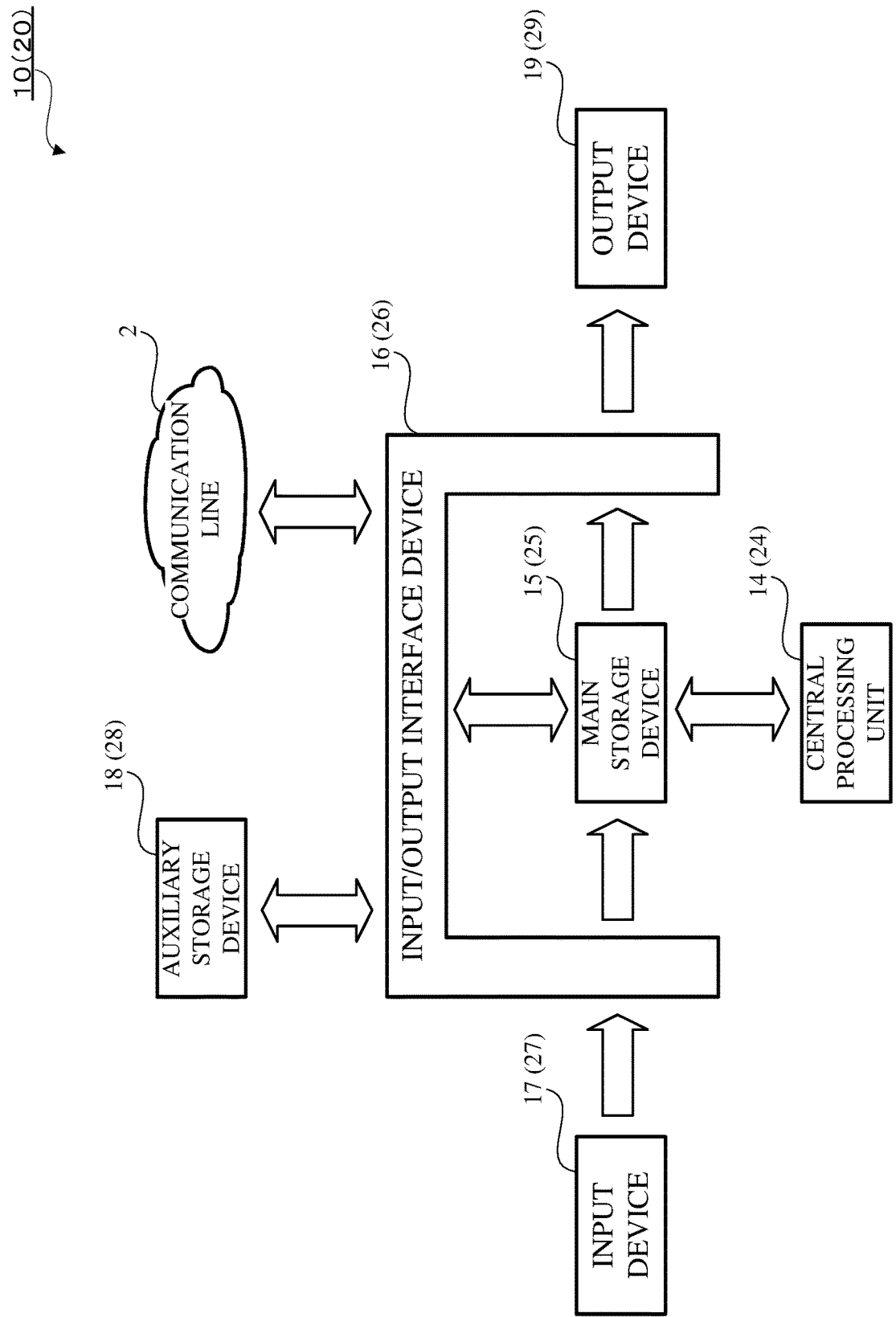
FIG. 2 is a block diagram schematically showing an example of a hardware configuration of a terminal 10 (server device 20) shown in FIG. 1.

A hardware configuration example of each terminal 10 will be described with reference to FIG. 2. FIG. 2 is a block diagram schematically showing an example of the hardware configuration of the terminal 10 (server device 20) shown in FIG. 1 (in FIG. 2, reference numerals in parentheses are described in relation to the server device 20, as will be described later).

As shown in FIG. 2, each terminal 10 can mainly include a central processing unit 14, a main storage device 15, an input/output interface device 16, an input device 17, an auxiliary storage device 18, and an output device 19. These devices are connected to one another by a data bus and/or a control bus.

The central processing unit 14, which is referred to as a "CPU", performs calculation on an instruction and data stored in the main storage device 15, and stores the result of the arithmetic operation in the main storage device 15. Furthermore, the central processing unit 14 can control, via the input/output interface device 16, the input device 17, the auxiliary storage device 18, the output device 19, and the like. The terminal 10 can include one or more central processing units 14.

The main storage device 15, which is referred to as a "memory", stores an instruction and data received via the input/output interface device 16 from the input device 17, the auxiliary storage device 18, and a communication line 2 (server device 20 or the like), as well as a calculation result of the central processing unit 14. The main storage device 15 can include computer-readable media such as volatile memory (e.g., registers, cache, random access memory (RAM)), non-volatile memory (e.g., read-only memory (ROM), EEPROM, flash memory) and storage (e.g., a hard disk drive (HDD), solid-state drive (SSD), magnetic tape, optical media), without being limited thereto. As should be readily understood, the term computer-readable storage media includes the media for data storage such as memory and storage, and not transmission media such as modulated data signals or transitory signals.

The auxiliary storage device 18 is a storage device having a capacity larger than that of the main storage device 15. The auxiliary storage device 18 can store an instruction and data (computer program) constituting the above-mentioned specific application (video distribution application, video viewing application, and the like) and a web browser application. Furthermore, when controlled by the central processing unit 14, the auxiliary storage device 18 can transmit these instructions and data (computer program) to the main storage device 15 via the input/output interface device 16. The auxiliary storage device 18 can include a magnetic disk device and/or an optical disk device, without limiting to them.

The input device 17 is a device that fetches data from the outside, and includes a touch screen, a button, a keyboard, a mouse, and/or a sensor, without limiting to them. The sensor can include a sensor including one or more cameras or the like and/or one or more microphones or the like, without limiting to them, as described below.

The output device 19 can include a display device, a touch screen, and/or a printer device, without limiting to them.

With such hardware configuration, by sequentially loading, into the main storage device 15, instructions and data (computer program) constituting a specific application stored in the auxiliary storage device 18 and calculating the loaded instructions and data, the central processing unit 14 can control the output device 19 via the input/output interface device 16 or transmit/receive various information (data) to/from other units (e.g., server device 20, other terminal 10, and/or studio unit 30) via the input/output interface device 16 and the communication line 2.

Thus, by executing the installed specific application, the terminal 10 can execute at least one motion of the following motions (a) to (d) below, for example.

(a) Motion used to distribute the first video and/or the second video
(b) Motion used to receive token data (gift data or gift information) and/or comment information transmitted to the own terminal 10 by another terminal 10
(c) Motion used to receive the first video and/or the second video distributed by the other terminal 10
(d) Motion used to transmit token data (gift data or gift information) and/or comment information to the other terminal 10

The terminal 10 may include one or more microprocessors and/or graphics processing units (GPU) in place of the central processing unit 14 or together with the central processing unit 14.

2-2. Hardware Configuration of Server Device 20

A hardware configuration example of each server device 20 will be described similarly with reference to FIG. 2. The hardware configuration of each server device 20 (each of distribution server device 20A1, DB server device 20A2, game API server device 20A3, game server device 20B1, and content server device 20B2) can be, for example, one identical to the hardware configuration of each terminal 10 described above. Therefore, reference numerals for components included in each server device 20 are shown in parentheses in FIG. 2.

As shown in FIG. 2, each server device 20 can mainly include a central processing unit 24, a main storage device 25, an input/output interface device 26, an input device 27, an auxiliary storage device 28, and an output device 29. These devices are connected to one another by a data bus and/or a control bus.

The central processing unit 24, the main storage device 25, the input/output interface device 26, the input device 27, the auxiliary storage device 28, and the output device 29 can be substantially the identical to the central processing unit 14, the main storage device 15, the input/output interface device 16, the input device 17, the auxiliary storage device 18, and the output device 19, respectively, included in each terminal 10 described above.

With such hardware configuration, by sequentially loading, into the main storage device 25, instructions and data (computer program) constituting a specific application stored in the auxiliary storage device 28 and calculating the loaded instructions and data, the central processing unit 24 can control the output device 29 via the input/output interface device 26 or transmit/receive various information to/from other units (e.g., each terminal 10 and/or studio unit 30) via the input/output interface device 26 and the communication line 2.

Thus, the server device 20 can execute a motion used for distributing, to each viewer terminal 12, the first video and/or the second video transmitted by each distributor terminal 11, a motion used for transmitting, to the distributor terminal 11, token data (gift data or gift information) and/or comment information transmitted to a certain distributor terminal 11 by each viewer terminal 12, and the like (including various motions described in detail below).

The server device 20 may include one or more microprocessors and/or graphics processing units (GPU) in place of the central processing unit 24 or together with the central processing unit 24.

2-3. Hardware Configuration of Studio Unit 30

The studio unit 30 can perform the same function as that of the terminal 10 and/or the server device 20 as described above Therefore, the studio unit 30 can have the same hardware configuration as that of the terminal 10 or the server device 20 described above.

3. Function of Each Device

Next, an example of the function of each of the terminal 10, the server device 20, and the studio unit 30 will be described.

3-1. Function of Terminal 10

Figure 3:
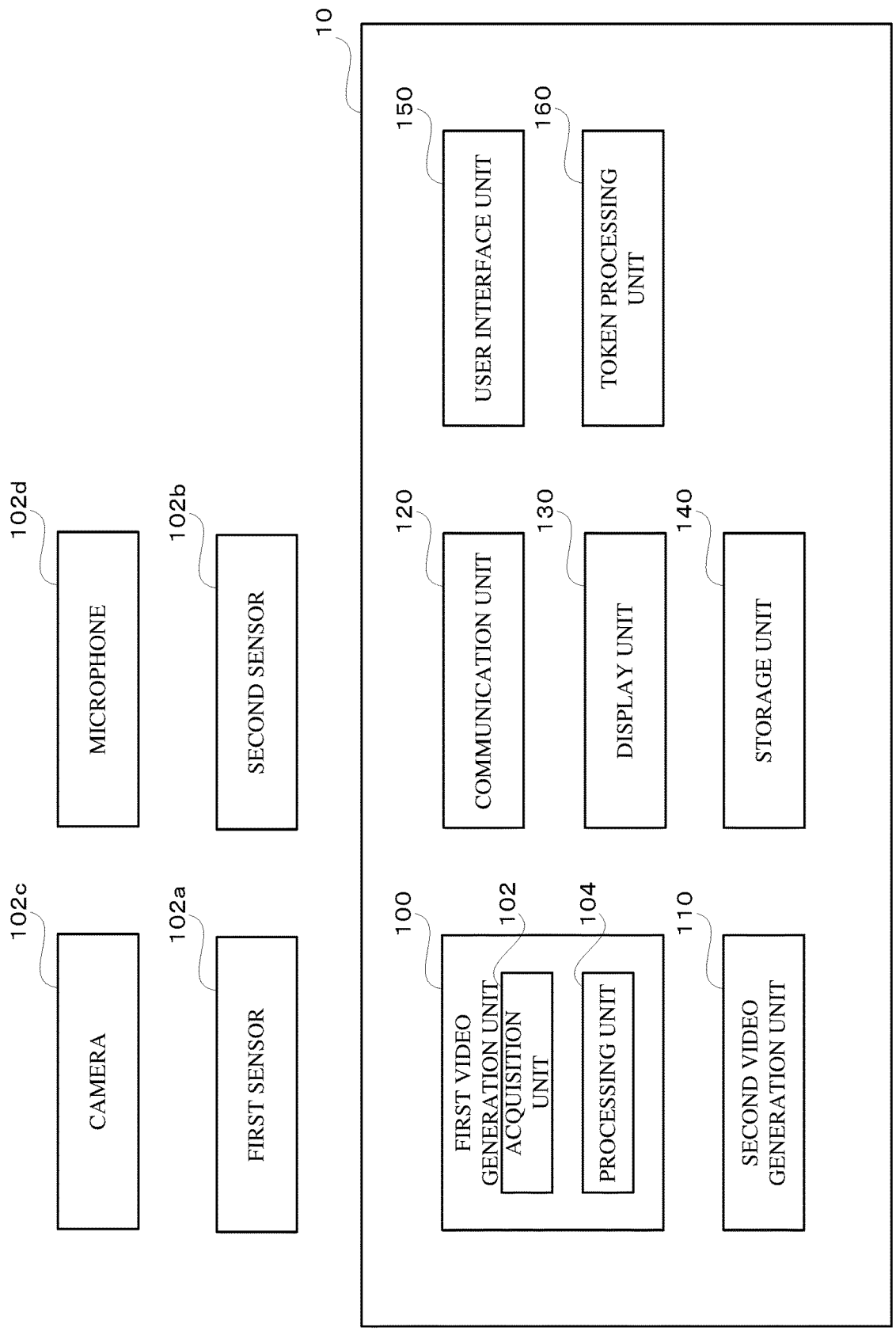
FIG. 3 is a block diagram schematically showing an example of a function of the terminal 10 shown in FIG. 1.

An example of the function of the terminal 10 will be described with reference to FIG. 3. FIG. 3 is a block diagram schematically showing an example of the function of the terminal 10 shown in FIG. 1.

As shown in FIG. 3, the terminal 10 can mainly include a first video generation unit 100, a second video generation unit 110, a communication unit 120, a display unit 130, a storage unit 140, a user interface unit 150, and a token (gift) processing unit 160.

(1) First Video Generation Unit 100

The first video generation unit 100 can generate the first video including an animation of an avatar object of a distributor on the basis of motion data regarding the motion of the distributor. In order to achieve this, the first video generation unit 100 can include, for example, an acquisition unit 102 and a processing unit 104.

For example, the motion data can be acquired using a motion capture system. The motion data can be produced with a camera 102c. As will be readily understood to one of ordinary skill in the art having the benefit of the present disclosure, examples of suitable motion capture systems that can be used with disclosed apparatus and methods include optical motion capture systems, including such systems using passive markers, active markers, or markerless systems and non-optical systems, including inertial and magnetic systems. Motion data can be capture with an image capture devices (such as a CCD (charge-coupled device) or CMOS (complementary metal oxide semiconductor) image sensor) coupled to a computer that transforms the motion data into video or other image data.

The acquisition unit 102 can include one or more first sensors 102a that acquire data regarding the body of the distributor, one or more second sensors 102b that acquire voice data regarding an utterance and/or singing emitted by the distributor, a camera 102c, and a microphone 102d. Here, the terminal 10 and each of the first sensor 102a, the second sensor 102b, the camera 102c, and the microphone 102d are connected, for example, by wire or wirelessly.

The first sensor 102a is connected with the camera 102c, for example, by wire or wirelessly. The camera 102c can include, for example, an RGB camera that captures visible light and a near-infrared camera that captures near-infrared camera. The camera 102c can be, for example, one included in True Depth camera of iphone X (registered trademark). The second sensor 102b is connected to the microphone 102d, for example, by wire or wirelessly. The first sensor 102a and the camera 102c can be provided as one configuration. The second sensor 102b and the microphone 102d can be provided as one configuration.

First, as for the first sensor 102a, the acquisition unit 102 captures the body of the distributor by using the first sensor 102a placed close to the body of the distributor. Thus, the acquisition unit 102 can generate data (e.g., MPEG file) in which an image acquired by the RGB camera is recorded over a unit time in association with a time code (code indicating the time acquired). Furthermore, the acquisition unit 102 can generate data (e.g. TSV file) in which a numerical value (e.g., numerical value of floating point number) indicating a predetermined number (e.g., 51) of depths acquired by the near-infrared camera is recorded over a unit time in association with the time code. The TSV file is a file in a format where a plurality of data are recorded with data separated by tabs.

As for the near-infrared camera, specifically, a dot projector radiates, to the body of the performer, an infrared laser that forms a dot pattern, and the near-infrared camera captures the infrared dots projected and reflected on the body of the performer and generates an image of the infrared dots thus captured. By comparing an image of a dot pattern radiated by a dot projector registered in advance with an image captured by the near-infrared camera, the acquisition unit 102 can calculate the depth (distance between each point or each feature point and the near-infrared camera) of each point (each feature point) by using the positional deviation at each point (each feature point) (e.g., each of 51 points and feature points) in the both images. The acquisition unit 102 can generate data in which a numerical value indicating the thus calculated depth is recorded over a unit time in association with the time code as described above.

Next, as for the second sensor 102b, the acquisition unit 102 acquires voice related to an utterance and/or singing emitted by the distributor using the second sensor 102b placed close to the body of the distributor. Thus, the acquisition unit 102 can generate data (e.g., MPEG file) recorded over a unit time in association with a time code. In an embodiment, the acquisition unit 102 can acquire data regarding the body of the distributor using the first sensor 102a, and at the same time, acquire voice data regarding an utterance and/or singing emitted by the distributor using the second sensor 102b. In this case, the acquisition unit 102 can generate data (e.g., MPEG file) in which the image acquired by the RGB camera and the voice data regarding the utterance and/or singing emitted by the distributor using the second sensor 102b are recorded over a unit time in association with the identical time code.

The acquisition unit 102 can output, to the processing unit 104, the data (MPEG file, TSV file, or the like) related to the body of the distributor thus generated and/or the voice data (MPEG file or the like) related to the utterance and/or singing emitted by the distributor.

The case where the first sensor 102a includes an RGB camera and an infrared camera has been described here. However, the first sensor 102a can include, for example, any of the following (A) to (C).

(A) Camera that detects infrared light radiated by an infrared laser and reflected on the face of the performer
(B) Plurality of RGB cameras that capture visible light
(C) Single camera that captures visible light In the case of (A) above, the acquisition unit 102 can calculate the depth for each feature point in the body of the distributor by the same method as described above. In the case of (B) above, the acquisition unit 102 can calculate the depth of each feature point of the body of the distributor using a plurality of images captured by a plurality of RGB cameras. In the case of (c) above, the acquisition unit 102 can calculate, by using deep learning or the like, the depth of each feature point in the body of the distributor from an image captured by a single camera. Moreover, in the case of (c) above, the acquisition unit 102 can calculate the depth of each feature point of the body of the performer by analysis processing (image processing and the like) for the image captured by the single camera.

The processing unit 104 can generate a video including an animation of a virtual character (avatar object of the distributor) on the basis of the data regarding the body of the distributor from the acquisition unit 102. As for the video itself of the virtual character, the processing unit 104 can generate the video of the virtual character by causing a rendering unit not illustrated to execute rendering using various information (e.g., geometry information (geometry data), bone information (bone data), texture information (texture data), shader information (shader data), blend shape information (blend shape data), and so on) stored in a character data storage unit not illustrated.

Furthermore, by using various known techniques, the processing unit 104 can generate a video (e.g., a video in which the facial expression of the avatar object changes in synchronization with the movement of the mouth and both eyes of the performer, e.g., a video in which the facial expression of the avatar object changes in response to lip-sync and gaze tracking with respect to the face of the performer) in which the facial expression of the avatar object or the like is changed by using the data (data regarding the depth of each feature point in the body of the performer) related to the body of the distributor from the acquisition unit 102.

Any other known technique can be used for generating the first video including an animation of the avatar object of the distributor on the basis of the motion data regarding the motion of the distributor.

(2) Second Video Generation Unit 110

The second video generation unit 110 can generate a second video regarding a game on the basis of the operation data regarding the operation of the distributor by using a web page received from the web server system 20B.

Specifically, the second video generation unit 110 executes a game program incorporated in the web page received from the web server system 20B. Thus, the second video generation unit 110 can render a second video (game video) related to a game in which at least one game object operates, on the basis of the operation data indicating the operation of the distributor input by the user interface unit 150.

Furthermore, the second video generation unit 110 can control at least one game object that should be displayed on the second video, on the basis of the token data (gift data or gift information) generated by the viewer terminal of each viewer viewing the second video and transmitted to the user (distributor) of the terminal 10. The token data (gift data or gift information) is information indicating that a token (gift) is given to the distributor.

(3) Communication Unit 120

The communication unit 120 can communicate various information required for distribution and/or viewing of a video between the distribution server system 20A and the web server system 20B. For example, when the terminal 10 operates as the distributor terminal 11, the communication unit 120 can access the web server system 20B and receive a web page (HTML document) or the like including a game program required for execution of a game or the like. When the terminal 10 operates as a distributor terminal, the communication unit 120 can transmit the first video and/or the second video to the distribution server system 20A, and receive, from the distribution server system 20A, the token data (gift data or gift information) and/or comment information transmitted to the distributor.

Furthermore, when the terminal 10 operates as a viewer terminal, the communication unit 120 can receive, from the distribution server system 20A, the first video and/or the second video transmitted by the distributor terminal 11, and transmit, to the distribution server system 20A, the token data (gift data or gift information) and/or comment information to the distributor. The communication unit 120 may comprise transceiver circuitry that is formed from one or more integrated circuits. The communication unit 120 may be adapted to communicate using any suitable technology, including a mobile telephone network, a wireless network (e.g., RF connections via Bluetooth, WiFi (such as IEEE 802.11a/b/n), WiMax, cellular, satellite, laser, infrared), a fixed telephone network, the Internet, an intranet, a local area network (LAN), a wide-area network (WAN), and/or an Ethernet network, without being limited thereto.

(4) Display Unit 130

The display unit 130 can display various information required for distribution and/or viewing of the video. For example, the display unit 130 can display the first video and/or the second video to be distributed and/or the first video and/or the second video having been received. The display unit 130 may include a display device, such as a liquid crystal display (LCD), light-emitting diode (LED) display, organic light-emitting diode (OLED) display, or the like.

(5) Storage Unit 140

The storage unit 140 can store various information required for distribution and/or viewing of the video using computer-readable memory or storage devices.

(6) User Interface Unit 150

The user interface unit 150 can input, via a user operation, various information required for distribution and/or viewing of the video. For example, the user interface unit 150 can input, from the distributor, operation data indicating the content of the operation of the distributor in executing the game, and output the operation data to the second video generation unit 110. The user interface unit 150 may include a touch input device, such as a keyboard, keypad, mouse, touch screen display, pen, or trackball, a voice input device, a camera, an image sensor, a scanning device, or another device, that provides user input.

(7) Token (Gift) Processing Unit 160

The token (gift) processing unit 160 can process token data (gift data or gift information) transmitted/received regarding the distribution and/or viewing of the video. For example, when the terminal 10 operates as the distributor terminal 11, the token (gift) processing unit 160 can process the token data (gift data or gift information) transmitted to the distributor. When the terminal 10 operates as the viewer terminal 12, the token (gift) processing unit 160 can process the token data (gift data or gift information) that should be transmitted by the viewer. The token processing unit 160 can be implemented with a processor coupled to a memory storing computer-readable instructions executed by the processor to process token data.

3-2. Function of Server Device 20

Figure 4:
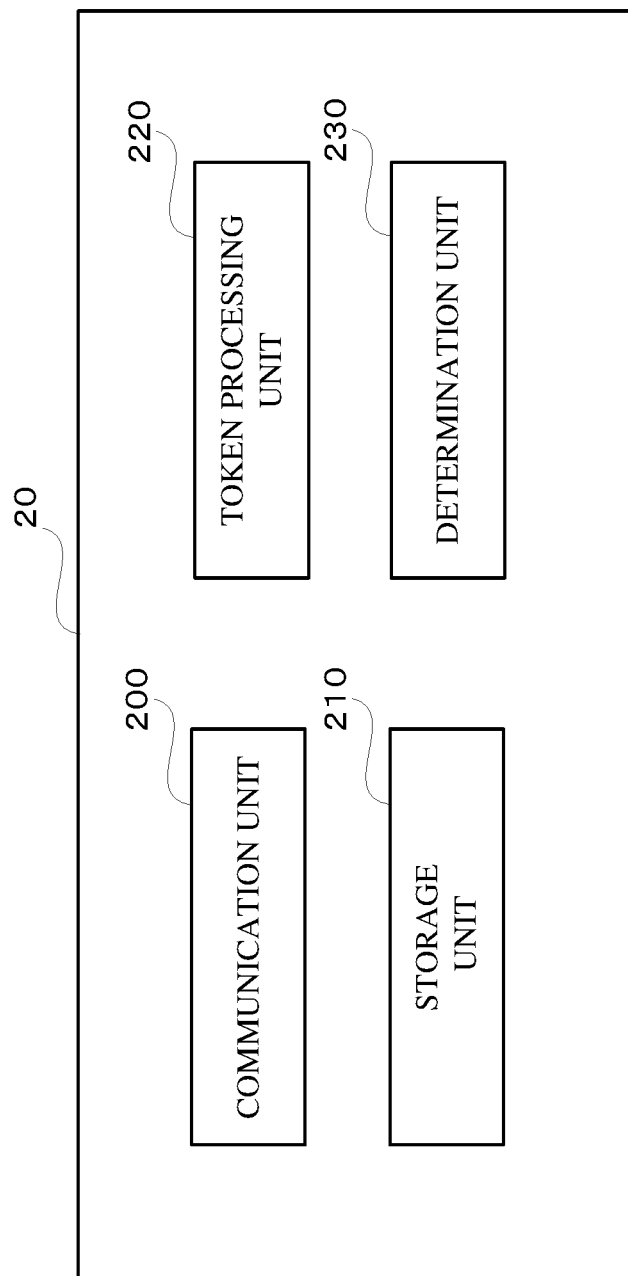
FIG. 4 is a block diagram schematically showing an example of a function of the server device 20 shown in FIG. 1.

An example of the function of the server device 20 will be described with reference to FIG. 4. FIG. 4 is a block diagram schematically showing an example of the function of the server device 20 shown in FIG. 1. As shown in FIG. 4, the server device 20 includes, for example, a communication unit 200, a storage unit 210, a token (gift) processing unit 220, and a determination unit 230.

(1) Communication Unit 200

The communication unit 200 can communicate various information required for distribution and/or viewing of a video between the distributor terminal 11 and/or the viewer terminal 12. For example, when operating as the distribution server system 20A, the server device 20 can receive, from each distributor terminal 11, the first video and/or the second video, and distribute them to each viewer terminal 12. When operating as the web server system 20B, the server device 20 can transmit, to each distributor terminal 11 having accessed, a web page in which a game program is incorporated. The communication unit 200 may comprise transceiver circuitry that is formed from one or more integrated circuits. The communication unit 200 may be adapted to communicate using any suitable technology, including a mobile telephone network, a wireless network (e.g., RF connections via Bluetooth, WiFi (such as IEEE 802.11a/b/n), WiMax, cellular, satellite, laser, infrared), a fixed telephone network, the Internet, an intranet, a local area network (LAN), a wide-area network (WAN), and/or an Ethernet network, without being limited thereto.

(2) Storage Unit 210

The storage unit 210 can store various information required for distribution and/or viewing of the video. The storage unit 210 can store such data in computer-readable memory or storage devices. The storage unit 210 stores, for example, data regarding the distribution history of the collaborative distribution performed by the first distributor together with another distributor. The data stored in the storage unit 210 is updated, for example, every time the terminal 10 executes distribution and/or views the distribution. Of the data stored in the storage unit 210, data regarding at least one user performed collaborative distribution together with the first distributor is sometimes referred to as first data. The first data is, for example, data regarding a user distributed in the past a game together with the first distributor and/or a user distributed a video using his/her own avatar together with the avatar of the first distributor. The storage unit 210 stores, for example, fifth data. The fifth data includes, for example, data indicating a parameter in a game that at least one user has ever distributed or viewed in the past, and data indicating a relationship between at least one user and the first distributor. The fifth data includes at least any of, for example, the number of times of distribution of a game distributed in the past by at least one user, the number of times of view of a game viewed in the past by at least one user, data indicating the level of the avatar of at least one user, data indicating the ranking of at least one user, data indicating the number of times of distribution of the game distributed by at least one user together with the first distributor in the game distributed in the past by the first distributor, data indicating the number of times of view of the game distributed in the past by the first distributor viewed by at least one user, data indicating the history in which at least one user has belonged to an event in the game executed in the past by the first distributor, data indicating whether or not at least one user follows the first distributor, data indicating the total number of messages transmitted between at least one user and the first distributor, and data indicating the amount of the tokens (gifts) and the content of the tokens (gifts) given to the first distributor by at least one user in the game distributed in the past by the first distributor.

The data stored in the storage unit 210 includes information (data) regarding at least one of, for example, "collaboration information (collaboration data)", "distribution time/viewing time", "game progress", "match history", "number of followers", "special skill", and "token data (gift data or gift information)".

The "collaboration information" includes information (data) indicating a parameter in the game distributed or viewed in the past by another distributor distributed the game by collaborative distribution together with the first distributor, for example. The "collaboration information" can include information (data) regarding video distribution using the avatar of the first distributor and the avatar of the other distributor, for example. The "distribution time/viewing time" refers to the time when a user operating each terminal 10 distributed or viewed the game in the past. The storage unit 210 stores the accumulated time of the time in which each user distributed and/or viewed in the past each game, for example.

The "game progress" indicates the progress of the game distributed in the past by the distributor. The "match history" indicates the number of wins, the number of losses, and the number of draws for the user participated in the game, for example, in a case where the game to be executed is a match game. The "match history" may be a ranking of the users participated in the game, for example, in a case where the game to be executed is a match game. The "match history" may be a score calculated by quantification performed by applying a predetermined weight to a win, a loss, a draw, and ranking.

The "number of followers" is a number corresponding to the number of follows of one user followed by other users. The larger the number of followers of the one user is, the higher the degree of interest from many users is. The "special skill" refers to a skill (killer move) that the avatar of the distributor has. The special skill includes a killer move that can be used in the game for giving damage to the opponent side, for example, in a case where the game being executed is a match game. The killer move gives the opponent side a larger damage than that caused by a normal attack, for example. The killer move exhibits a larger effect than that by a normal attack, for example. The storage unit 210 stores, for example, the name of a special skill, usage conditions for enabling the use of the special skill, and the like.

The "token data (gift data or gift information)" is, for example, the number of tokens (gifts), the value of a token (gift), the type of a token (gift), the level of a token (gift), and the like that are quantified in accordance with a predetermined table, and description of the total of the numerical values of tokens (gifts). For example, the "token data (gift data or gift information)" can include at least any of the time, frequency, and number of times in which a token (gift) was given (sent) from the viewer terminal 12 to the distributor terminal 11. The number of tokens (gifts) is the number given to the first distributor by the viewer. Here, the "value of a token (gift)" corresponds to the price of the token (gift), for example, in a case of a paid token (gift), and the "value of a token (gift)" corresponds to the consumption point of the token (gift) in a case of a free token (gift). The "value of a token (gift)" may be decided on the basis of, for example, the usable time of the token (gift), the display time of the token (gift), the number of people who can use the token (gift) at the same time, and/or the total number of tokens (gifts) available in the game. A short usable time of the token (gift) means that the token (gift) has a high value. A long usable time of the token (gift) means that the token (gift) has a low value. A long display time of the token (gift) means that the token (gift) has a high value. A short display time of the token (gift) means that the token (gift) has a low value. A small number of people who can use the token (gift) at the same time means that the token (gift) has a high value. A large number of people who can use the token (gift) at the same time means that the token (gift) has a low value. A small total number of tokens (gifts) available in the game means that the token (gift) is rare and has a high value. A large total number of tokens (gifts) available in the game means that the token (gift) is not rare and has a low value.

(3) Token (Gift) Processing Unit 220

The token (gift) processing unit 220 can process token data (gift data or gift information) transmitted from each viewer to each distributor. When the server device 20 operates as the web server system 20B, the token (gift) processing unit 220 may be omitted. The token processing unit 220 can be implemented with a processor coupled to a memory storing computer-readable instructions executed by the processor to process token data.

(4) Determination Unit 230

The determination unit 230 determines various conditions, for example, determines whether or not the start condition of the collaborative distribution has been satisfied (S314 described later), determines whether or not a first condition has been satisfied (S318 described later), and determines whether or not a predetermined length of time has elapsed (S326 described later). It should be noted that the first condition is a condition for determining whether or not to terminate the collaborative distribution. The determination unit 230 determines various conditions, for example, determines whether or not there is a relief request (S414 described later), determines whether or not there is a response to the relief request (S416 described later), and determines whether or not the collaborative distribution has been ended (S426 described later). The determination unit 230 can be implemented with a processor coupled to a memory storing computer-readable instructions executed by the processor to determine the various conditions.

(5) Extraction Unit 240

As shown in FIG. 5, an extraction unit 240 may be provided. The extraction unit 240 extracts the second data to be used for deciding the processing content in S324 described later during or after execution of collaborative distribution. After the end of collaborative distribution, the extraction unit 240 extracts the second data regarding at least any user of one or more users related to the first distributor on the basis of the first data regarding at least one user performed in the past collaborative distribution together with the first distributor. The extraction unit 240 can be implemented with a processor coupled to a memory storing computer-readable instructions executed by the processor to determine the various conditions.

3-3. Function of Studio Unit 30

The studio unit 30 can perform the same function as that of the terminal 10 and/or the server device 20 as described above Therefore, the studio unit 30 can have the function of the terminal 10 described with reference to FIG. 3 and/or the function of the server device 20 described with reference to FIG. 4.

4. Overall Motion of Video Distribution System 1

Next, the overall motion performed in the video distribution system 1 having the above configuration will be described with reference to FIGS. 6A to 7B.

Figure 6A:
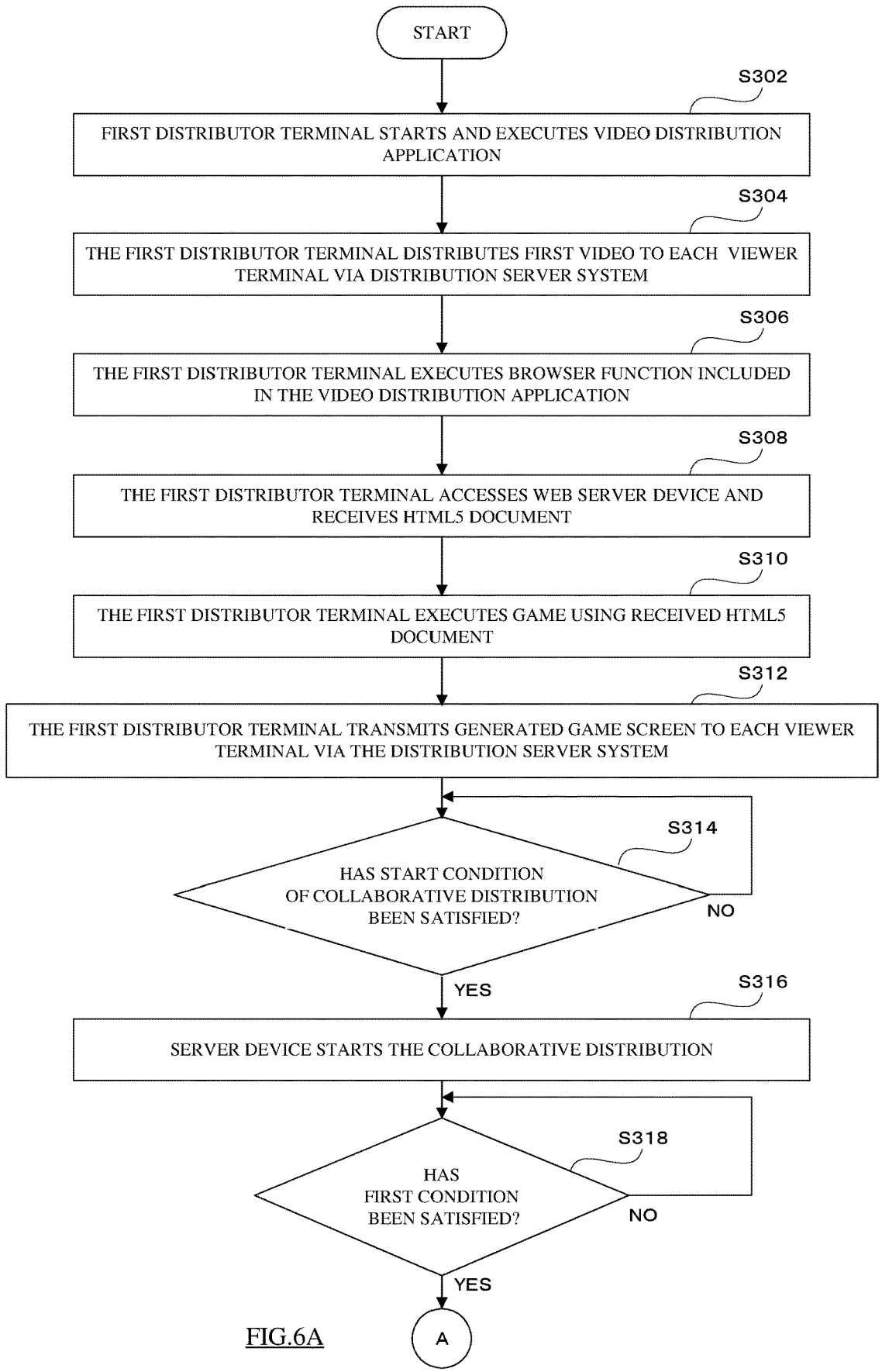
FIG. 6A is a flowchart showing an example of the motion performed in the video distribution system 1 shown in FIG. 1.
Figure 6B:
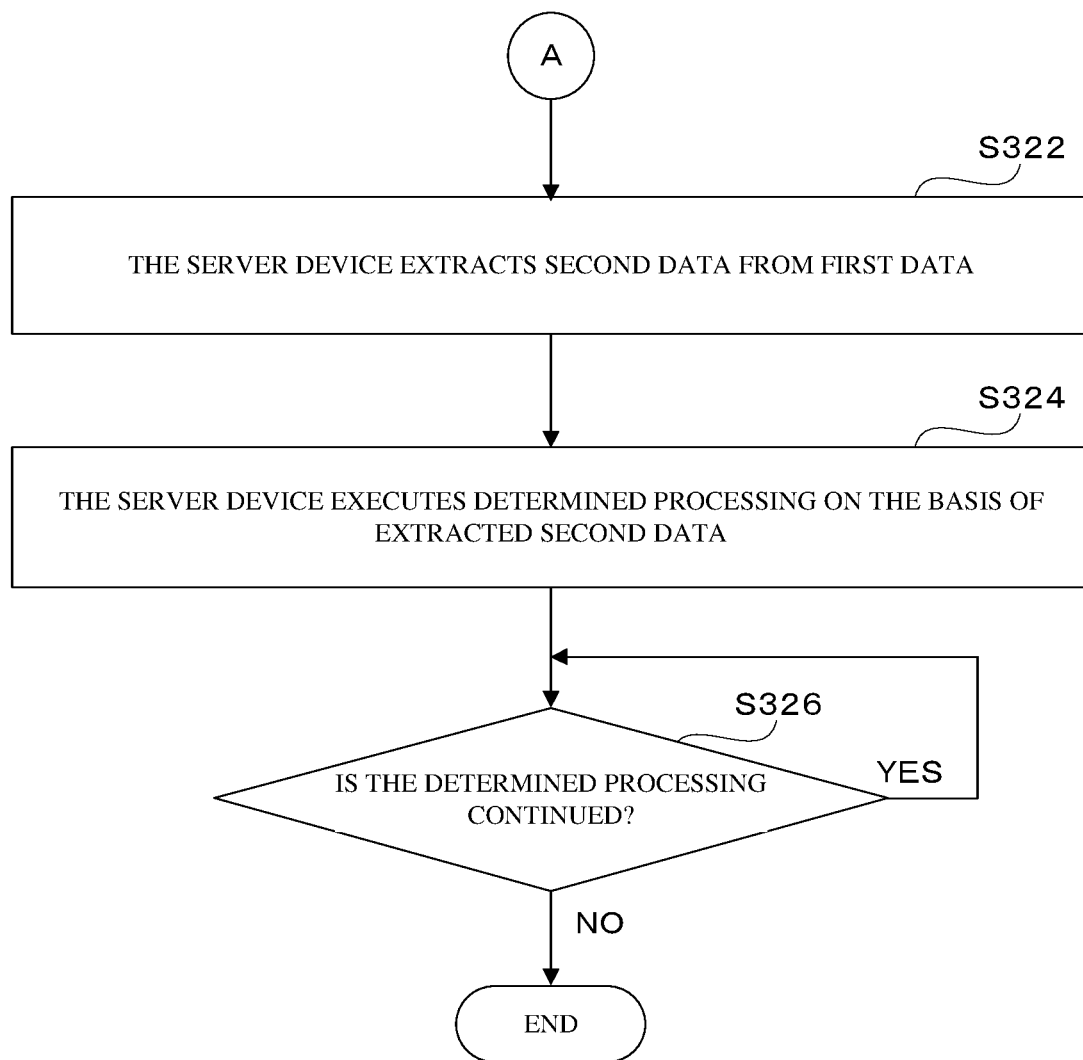
FIG. 6B is a flowchart showing an example of the motion performed in the video distribution system 1 shown in FIG. 1.

FIG. 6A and FIG. 6B are flowcharts showing an example of the motion performed in the video distribution system 1 shown in FIG. 1. In the present embodiment, for example, the description will be made hereinafter on the assumption that the number of users performing collaborative distribution with the first distributor is singular (second distributor). However, the number of users performing the collaborative distribution with the first distributor may be not singular but plural.

First, referring to FIG. 6A, in S302, in accordance with the operation of the distributor (first distributor), the terminal 10 (first distributor terminal 11A) starts and executes the video distribution application.

In S304, the first distributor terminal 11A generates the first video including the animation of the avatar object of the first distributor on the basis of the motion data regarding the motion of the first distributor. Thus, the display unit 130 of the first distributor terminal 11A displays the first video including the animation of the avatar object of the first distributor. Then, the first distributor terminal 11A transmits the generated first video to the distribution server device 20A1 of the distribution server system 20A. The distribution server device 20A1 distributes the first video received from the first distributor terminal 11A to each viewer terminal 12 executing the video viewing application. Thus, the display unit 130 of the viewer terminal 12 of each viewer also displays the first video.

In S306, when the first distributor taps or the like an icon 406 (not illustrated) called "game" displayed on the display unit 130 of the first distributor terminal 11A, the first distributor terminal 11A executes the browser function installed in the video distribution application. Thus, in S308, by accessing the web server system 20B in a state where the video distribution application is executed (e.g., the first video is distributed toward each viewer terminal 12), the first distributor terminal 11A can receive an HTML5 document in which a game program is incorporated.

In S310, by executing the game program incorporated in the received HTML5 document, the first distributor terminal 11A can generate a video (second video) regarding the game.

In S312, the first distributor terminal 11A transmits the second video (game screen) generated in S310 to the distribution server device 20A1 of the distribution server system 20A. The distribution server device 20A1 distributes the second video received from the first distributor terminal 11A to each viewer terminal 12 executing the video viewing application. This allows the second video to be also displayed on the display unit 130 of each viewer terminal 12. After the processing of S312 is executed, for example, after a predetermined length of time has elapsed, the processing of S314 is executed.

In S314, the server device 20 determines whether or not the start condition of collaborative distribution has been satisfied. In S314, if the server device 20 determines that the start condition of collaborative distribution has been satisfied (YES in S314), the processing proceeds to S316. On the other hand, in S314, if the server device 20 determines that the start condition of collaborative distribution has not been satisfied (NO in S314), the processing of S314 is performed again.

The processing agent of S314 to S326 is, for example, the game API server device 20A3 or the game server device 20B1 from among the server devices 20, but the processing agent is not limited to this, and may be, for example, another device from among the server devices 20.

The start conditions of collaborative distribution are satisfied, for example, when for the distribution distributed by the first distributor terminal 11A in a state where the collaborative distribution mode displayed on the display unit 130 is enabled (ON), the other terminal 10 transmits data regarding an application for collaborative distribution via the server device 20 to the first distributor terminal 11A, and the first distributor operates the first distributor terminal 11A to approve the application. By operating the first distributor terminal 11A, the first distributor can switch the collaborative distribution mode between enabled (ON) and disabled (OFF).

In S316, the server device 20 starts the collaborative distribution. When, for example, a predetermined length of time has elapsed after the start of the collaborative distribution, the processing of S318 is performed. In S316, by starting the collaborative distribution, the second video including the animation of the avatar object of the first distributor and the animation of the avatar object of a user (e.g., second distributor) other than the first distributor is displayed on the display unit 130 of the terminal 10 operated by the user distributing and/or viewing the game by the collaborative distribution.

In S316, after the server device 20 starts the collaborative distribution, the user distributing and/or viewing the game by the collaborative distribution can, by inputting the operation information and/or voice to the terminal 10 owned by the user, change the display content of the display screen of the terminal 10 and/or transmit the voice to the user operating the other terminal 10. In S316, after the server device 20 starts the collaborative distribution, the terminal 10 of the user distributing and/or viewing the game by the collaborative distribution can read data such as a live game content stored in the content server device 20B2.

In S316, after the server device 20 starts the collaborative distribution, the operation information and/or voice input to the user's own terminal 10 of the user distributing and/or viewing the game by the collaborative distribution can be stored in the server device 20 (e.g., game server device 20B1). The thus stored data can be used to decide the content of predetermined processing in S324 described later.

In S316, after the server device 20 starts the collaborative distribution, the server device 20 may configure the display contents of the display unit 130 of the terminal 10 operated by the user distributing and/or viewing the game by the collaborative distribution so as to be identical, or may configure the display contents of the display unit 130 of the terminal 10 operated by the user distributing and/or viewing the game by the collaborative distribution so as to be different. If the display contents of the display unit 130 of the plurality of distributor terminals 11 are configured so as to be different from each other, the viewer viewing the game by the collaborative distribution using the terminal 10 may cause the display content of the display unit 130 regarding any distributor of the plurality of distributors to be displayed on the display unit 130 of the user's own terminal 10.

An example in which the first distributor and the second distributor jointly distribute the game in S316 has been described, but the present invention is not limited to this, and it is only required that the first distributor and another distributor jointly distribute the game. For example, instead of the first distributor and the second distributor jointly distributing the game in S316, a video in which the avatar of the first distributor and the avatar of the second distributor perform together may be distributed.

In S318, the server device 20 decides whether or not the first condition has been satisfied. In S318, if the server device 20 determines that the first condition has been satisfied (YES in S318), the collaborative distribution is ended and S322 described in FIG. 6B is executed. On the other hand, in S318, if the server device 20 determines that the first condition has not been satisfied (NO in S318), the processing of S318 is repeated.

The first condition may be a condition satisfied, for example, by transmitting the third data that is the data requesting to end the collaborative distribution from the terminal 10 operated by the user executing and/or viewing the collaborative distribution, may be a condition satisfied by the lapse of a predetermined length of time (first length of time) from the start of the collaborative distribution, or may be one corresponding to satisfying a condition in the game executed by the collaborative distribution. Here, the above-mentioned "requesting to end the collaborative distribution" is, for example, a request obtained from the first distributor or the second distributor when a collaborative distribution is performed using the avatar of the first distributor (host distributor) and the avatar of the second distributor (guest). The above-mentioned "conditions in the game" are, for example, conditions such as knocking down a character different from the character to be operated in the stage prepared in the game, acquiring a predetermined item in the stage, moving the character to be operated in the stage to a predetermined position, or that the parameter of the character to be operated in the stage is equal to or greater than a predetermined value or less than the predetermined value. The knocking down a character different from the character to be operated in the stage prepared in the game, acquiring a predetermined item in the stage, and moving the character to be operated in the stage to a predetermined position can correspond to clearing the stage. It can correspond to the death of the character to be operated that the parameter of the character to be operated in the stage is equal to or greater than a predetermined value or less than the predetermined value.

When a determination of YES is made in S318 and the collaborative distribution is ended, for example, the first distributor terminal 11A is configured so that the first distributor can continue the distribution, and the second distributor terminal 11B is configured so that the second distributor does not perform the distribution. In this case, the second distributor terminal 11B may be configured so that the second distributor can continue to view the distribution content regarding the distribution as a viewer.

In S322, on the basis of the first data, the server device 20 extracts the second data regarding a user other than the first distributor. The first data is data regarding at least one user having performed collaborative distribution in the past with the first distributor, and is stored in the storage unit 210, for example. The second data includes at least any of, for example, data indicating a parameter in a game distributed or viewed in the past by a user other than the first distributor, and data indicating a relationship between the first distributor and a user other than the first distributor.

In S324, the server device 20 executes predetermined processing on the basis of the second data extracted from the first data. Specifically, in S324, the server device 20 changes at least one current parameter of the avatar of the first distributor on the basis of the second data, or displays the avatar of the first distributor and the avatar of the user other than the first distributor on the second video on the basis of the second data. More specifically, for example, in a case where the current parameter (a determined parameter) of the avatar of the first distributor is changed to a first parameter, the first parameter can be displayed in the second video, information indicating that the current parameter (the determined parameter) has been changed to the first parameter can be displayed in the second video, or an avatar having the first parameter can be displayed in the second video, thereby allowing at least one viewer to readily recognize the fact that the current parameter (the determined parameter) of an avatar of the first distributor has been updated. It should be noted that the avatar having the first parameter corresponds to the avatar having the determined parameter. Alternatively, for example, on the basis of the second data regarding the second distributor, the server device 20 displays the avatar of the first distributor and the avatar of the second distributor in the second video instead of changing the parameter of the avatar of the first distributor to the parameter of the avatar of the second distributor or displaying only the avatar of the first distributor in the second video.

According to the technology disclosed in the present application, the server device 20 can determine the first parameter to be used without receiving data requesting to change the determined parameter to the first parameter from the first distributor terminal 11A, thereby allowing to decrease a communication network load for the server device 20.

Further, according to the technology disclosed in the present application, in a case where a game being executed is a certain type of a match game where a distributor matches his/her opponent and the distributor uses his/her own avatar having the first parameter changed from the determined parameter, the game can advantageously progress for the distributor. Thus, at least one viewer who views the game can expect that the course of the game will be positively changed for the distributor due to the update of the parameter, thereby allowing to catch interest from the at least one viewer.

Further, according to the technology disclosed in the present application, the device of the distributor is able to calculate a control parameter related to a selected game object used in the game on the basis of viewer data so that the distributor is able to play the game advantageously. Therefore, as the distributor is able to complete the game more quickly, the terminal device of the distributor is able to: save the power consumption of the device; extend the battery life of the device; decrease CPU/memory loads; and/or decrease communication network loads. This is also true with the server device and the terminal devices of the viewers.

Further, according to the technology disclosed in the present application, an avatar corresponding to a user to act as a helper can be displayed as a game element in a game screen. This allows to aggregate information on a plurality of objects to be displayed and to display the plurality of objects in the game screen even when the size of the game screen is small.

In S324, in a case where the current parameter of the avatar of the first distributor is changed to a predetermined parameter (first parameter) on the basis of the second data, this first parameter is a parameter more advantageous for the progress of the game than the current parameter in the game. Specifically, in a case where the second data indicates a parameter regarding a specific user, and in a case where the parameter of the avatar of this specific user is more preferable for the progress of the game than the parameter of the first distributor, the current parameter of the avatar of the first distributor is changed to the parameter of the avatar of this specific user. Instead of changing the current parameter of the avatar of the first distributor to the parameter of the avatar of this specific user, a part of the parameter of the avatar of this specific user may be given to the avatar of the first distributor.

In S324, in the case where the avatar of the first distributor and the avatar of the user other than the first distributor are displayed in the second video on the basis of the second data, the user is the user having the largest number of times of distribution of the game with the first distributor, the user having the longest accumulated time in which the game is distributed with the first distributor, the user having the largest number of times of view of the game distributed in the past by the first distributor, the user having the longest accumulated time in which the game distributed in the past by the first distributor is viewed, or the user having the highest level in the game.

In S324, in the case where the avatar of the first distributor and the avatar of the user other than the first distributor are displayed in the second video on the basis of the second data, for example, the first distributor terminal 11A distributes the second video including the avatar of the first distributor and the avatar of the user other than the first distributor to each viewer terminal 12. This specific processing is the same as in S304.

Next, in S326, the server device 20 determines whether or not to continue the predetermined processing executed in S324. In S326, if the server device 20 determines to continue the predetermined processing executed in S324 (YES in S326), the processing of S326 is repeated. In S326, if the server device 20 determines not to continue the predetermined processing executed in S324 (NO in S326), the series of processing shown in FIGS. 6A and 6B is ended. In the case of NO in S326, instead of ending the series of processing shown in FIGS. 6A and 6B, any processing described in FIGS. 6A and 6B (e.g., processing of S314) may be performed.

As described above, according to the present disclosure, it is possible to store the first data regarding at least one user having performed collaborative distribution with the first distributor prior to the execution of the game; after the first distributor and at least one user have performed collaborative distribution, determine whether or not the first condition is satisfied; if determined that the first condition is satisfied, extract the second data regarding at least any of at least one user on the basis of the first data; and change at least one current parameter of the avatar of the first distributor on the basis of the second data during or after the execution of the game, or display the avatar of the first distributor and the avatar of at least any user of at least one user in the second video on the basis of the second data. Therefore, even if the second distributor performing video distribution together with the first distributor has stopped and left the video distribution, the possibility of spoiling the amusement of the game to be distributed later by the first distributor becomes low. In particular, in a case where the viewer's interest in the second distributor having performed collaborative distribution with the first distributor is higher than the viewer's interest in the first distributor, the effect of performing the processing of S324 is anticipated more.

(Various Aspects)

A computer program according to the first aspect can be "a computer program causing, by being executed by at least one processor, the processor to function so as to: distribute a first video and a second video toward a viewer terminal of at least one viewer via a communication line, the first video including either motion data regarding a motion of a first distributor or an animation of an avatar of the first distributor generated on the basis of the motion data, the second video regarding a game generated on the basis of operation data regarding an operation of the first distributor using a received web page; store first data regarding at least one user having performed collaborative distribution with the first distributor prior to execution of the game; determine whether or not a first condition is satisfied after the first distributor and the at least one user perform the collaborative distribution; extract second data regarding at least any user of the one or more users on the basis of the first data in a case where the first condition is satisfied; and change, during or after execution of the game, at least one current parameter of an avatar of the first distributor on the basis of the second data or display in the second video, during or after execution of the game, an avatar of the first distributor and an avatar of at least any user of the one or more users on the basis of the second data.

In the computer program according to the second aspect, in which in the first aspect, "the first data is data regarding at least any of the following: at least one user who jointly distributed a game with the first distributor, and at least one user who jointly distributed with the first distributor using an avatar of the first distributor and his/her own avatar".

In the computer program according to the third aspect, in which in the first aspect or the second aspect, "the computer program causes the processor to function so that the second data includes at least any of the following: data indicating a parameter in a game distributed or viewed by the at least one user in the past, and data indicating a relationship between the at least one user and the first distributor."

In the computer program according to the fourth aspect, in which in any of the first to the third aspects, "the computer program causes the processor to function so that in a case where when displaying on the basis of the second data, in the second video, avatars comprising an avatar of the first distributor and an avatar of at least any user of the one or more users, at least any user of the one or more users is one of the following: a user having the largest number of times for performing the collaborative distribution with the first distributor, a user having the longest accumulated time for performing the collaborative distribution with the first distributor, a user having the largest number of times for viewing distribution by the first distributor, a user having the longest accumulated time for viewing distribution by the first distributor, or a user having the highest level in the game.

In the computer program according to the fifth aspect, in which in any of the first to the fourth aspects, "the computer program causes the processor to function so that the first condition is a condition indicating that third data has been transmitted from either a distributor terminal of the first distributor or a distributor terminal of a distributor other than the first distributor, or is a condition indicating that first length of time has elapsed after the first distributor and the at least one user start the collaborative distribution".

In the computer program according to the sixth aspect, in which in the fifth aspect, "the computer program causes the processor to function so that the third data includes data requesting that an avatar of at least any user of the one or more users is displayed with an avatar of the first distributor in the second video.

In the computer program according to the seventh aspect, in which in any of the first to the sixth aspects, "the computer program causes the processor to function so that in a case where at least one current parameter of an avatar of the first distributor is changed on the basis of the second data or in a case where an avatar of the first distributor and an avatar of at least any user of the one or more users are displayed in the second video on the basis of the second data, a parameter regarding an avatar of the at least one user is changed".

In the computer program according to the eighth aspect, in which in any of the first to the seventh aspects, "the computer program causes the processor to function so that in a case where the current parameter is changed to a first parameter on the basis of the second data, the first parameter is a parameter more advantageous for the progress of the game than the current parameter in the game".

A computer program according to the ninth aspect can be "a computer program causing, by being executed by at least one processor, the processor to function so as to: receive a first video and a second video toward a viewer terminal of at least one viewer via a communication line, the first video including either motion data regarding a motion of a first distributor or an animation of an avatar of the first distributor generated on the basis of the motion data, the second video regarding a game generated on the basis of operation data regarding an operation of the first distributor using a received web page; determine whether or not a first condition is satisfied after the first distributor and the at least one user perform the collaborative distribution; receive a first video where at least one current parameter of an avatar of the first distributor is changed on the basis of second data extracted regarding at least any user of the one or more users on the basis of first data regarding at least one user having performed collaborative distribution with the first distributor prior to execution of the game in a case where the first condition is satisfied or receive a second video where an avatar of the first distributor and an avatar of at least any user of the one or more users on the basis of the second data.

In the computer program according to the tenth aspect, in which in any of the first to the ninth aspects, "the communication line includes the Internet".

In the computer program according to the eleventh aspect, in which in any of the first to the tenth aspects, "the at least one processor includes a central processing unit (CPU), a microprocessor, and/or a graphics processing unit (GPU)".

In the computer program according to the twelfth aspect, in which in any of the first to the eleventh aspects, "the at least one processor is mounted on a smartphone, a tablet, a mobile phone, and/or a personal computer.".

A method according to the thirteenth aspect can be "a method executed by at least one processor executing computer-readable instructions, the method including steps of, by executing the instructions with the processor, distributing a first video and a second video toward a viewer terminal of at least one viewer via a communication line, the first video including either motion data regarding a motion of a first distributor or an animation of an avatar of the first distributor generated on the basis of the motion data, the second video regarding a game generated on the basis of operation data regarding an operation of the first distributor using a received web page, storing first data regarding at least one user having performed collaborative distribution with the first distributor prior to execution of the game, determining whether or not a first condition is satisfied after the first distributor and the at least one user perform the collaborative distribution, extracting second data regarding at least any user of the one or more users on the basis of the first data in a case where the first condition is satisfied, and changing, during or after execution of the game, at least one current parameter of an avatar of the first distributor on the basis of the second data or displaying in the second video, during or after execution of the game, an avatar of the first distributor and an avatar of at least any user of the one or more users on the basis of the second data.

A method according to the fourteenth aspect can be "a method executed by at least one processor executing computer-readable instructions, the method including steps of, by executing the instructions with the processor, receiving a first video and a second video toward a viewer terminal of at least one viewer via a communication line, the first video including either motion data regarding a motion of a first distributor or an animation of an avatar of the first distributor generated on the basis of the motion data, the second video regarding a game generated on the basis of operation data regarding an operation of the first distributor using a received web page, determining whether or not a first condition is satisfied after the first distributor and the at least one user perform the collaborative distribution, and receiving a first video where at least one current parameter of an avatar of the first distributor is changed on the basis of second data extracted regarding at least any user of the one or more users on the basis of the first data regarding at least one user having performed collaborative distribution with the first distributor prior to execution of the game in a case where the first condition is satisfied or receiving a second video where at least one of an avatar of the first distributor and an avatar of at least any user of the one or more users is displayed on the basis of the second data.

In the method according to the fifteenth aspect, in which in the thirteenth or the fourteenth aspect, "the communication line includes the Internet".

In the method according to the sixteenth aspect, in which in any of the thirteenth to the fifteenth aspects, "the at least one processor includes a central processing unit (CPU), a microprocessor, and/or a graphics processing unit (GPU)".

A server device according to the seventeenth aspect can be "a server device comprising at least one processor, wherein the processor is configured to: transmit a first video and a second video toward a viewer terminal of at least one viewer via a communication line, the first video including either motion data regarding a motion of a first distributor or an animation of an avatar of the first distributor generated on the basis of the motion data, the second video regarding a game generated on the basis of operation data regarding an operation of the first distributor using a received web page; store first data regarding at least one user having performed collaborative distribution with the first distributor prior to execution of the game; determine whether or not a first condition is satisfied after the first distributor and the at least one user perform the collaborative distribution; extract second data regarding at least any user of the one or more users on the basis of the first data in a case where the first condition is satisfied; and change, during or after execution of the game, at least one current parameter of an avatar of the first distributor on the basis of the second data or display in the second video, during or after execution of the game, an avatar of the first distributor and an avatar of at least any user of the one or more users on the basis of the second data.

A server device according to the eighteenth aspect can be "a server device comprising at least one processor, wherein the processor is configured to: transmit a first video and a second video toward a viewer terminal of at least one viewer via a communication line, the first video including either motion data regarding a motion of a first distributor or an animation of an avatar of the first distributor generated on the basis of the motion data, the second video regarding a game generated on the basis of operation data regarding an operation of the first distributor using a received web page, and wherein the computer program causes the processor to function so that a distributor terminal of the first distributor is configured to: store first data regarding at least one user having performed collaborative distribution with the first distributor prior to execution of the game; determine whether or not a first condition is satisfied after the first distributor and the at least one user perform the collaborative distribution; extract second data regarding at least any user of the one or more users on the basis of the first data in a case where the first condition is satisfied; and change, during or after execution of the game, at least one current parameter of an avatar of the first distributor on the basis of the second data or display in the second video, during or after execution of the game, an avatar of the first distributor and an avatar of at least any user of the one or more users on the basis of the second data.

In the server device according to the nineteenth aspect, in which in the seventeenth aspect or the eighteenth aspect, "the communication line includes the Internet".

In the server device according to the twentieth aspect, in which in any of the seventeenth to the nineteenth aspects, "the at least one processor includes a central processing unit (CPU), a microprocessor, and/or a graphics processing unit (GPU)".

Figure 7A:
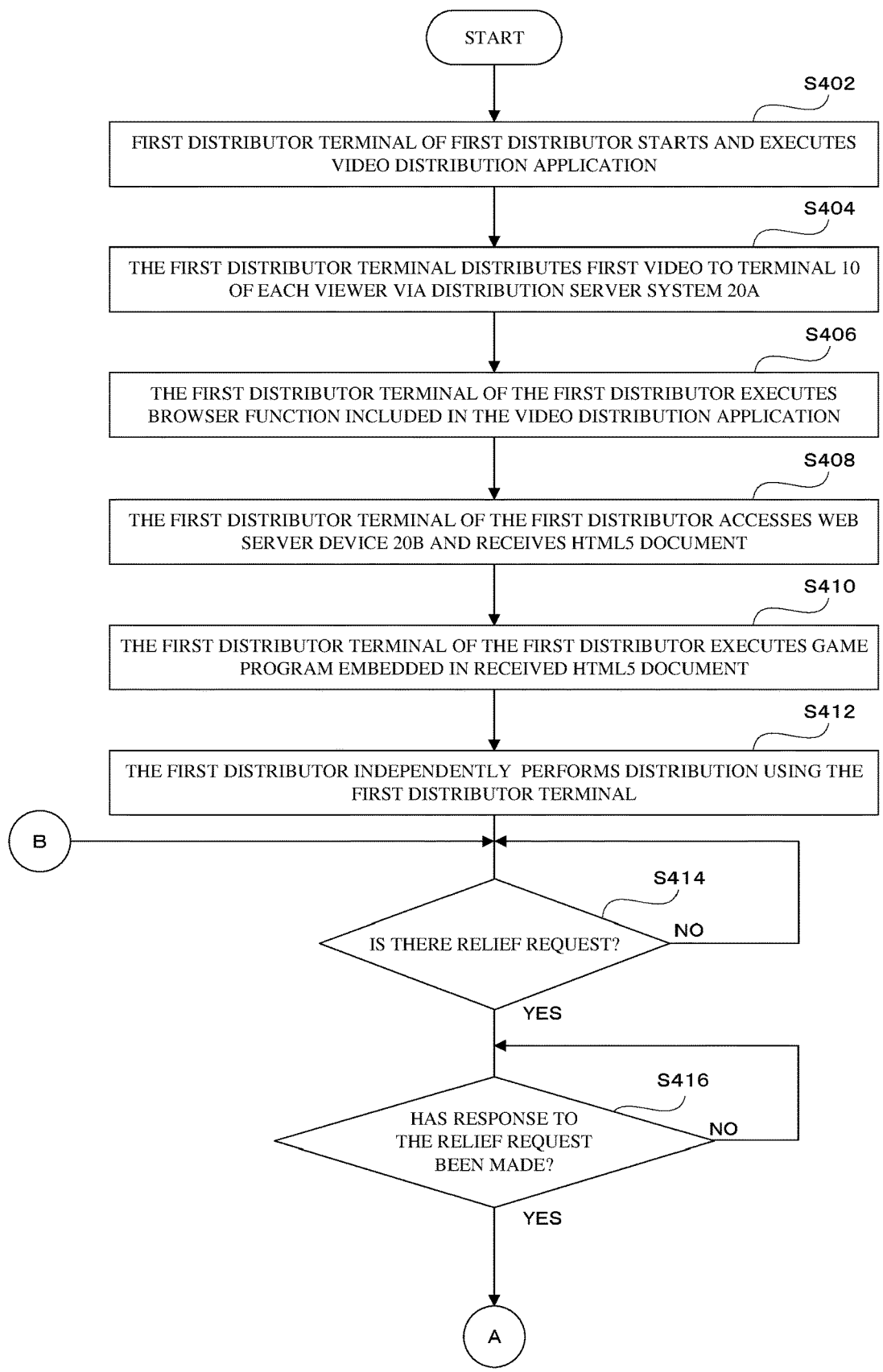
FIG. 7A is a flowchart showing an example of a motion performed in the video distribution system 1 shown in FIG. 1.
Figure 7B:
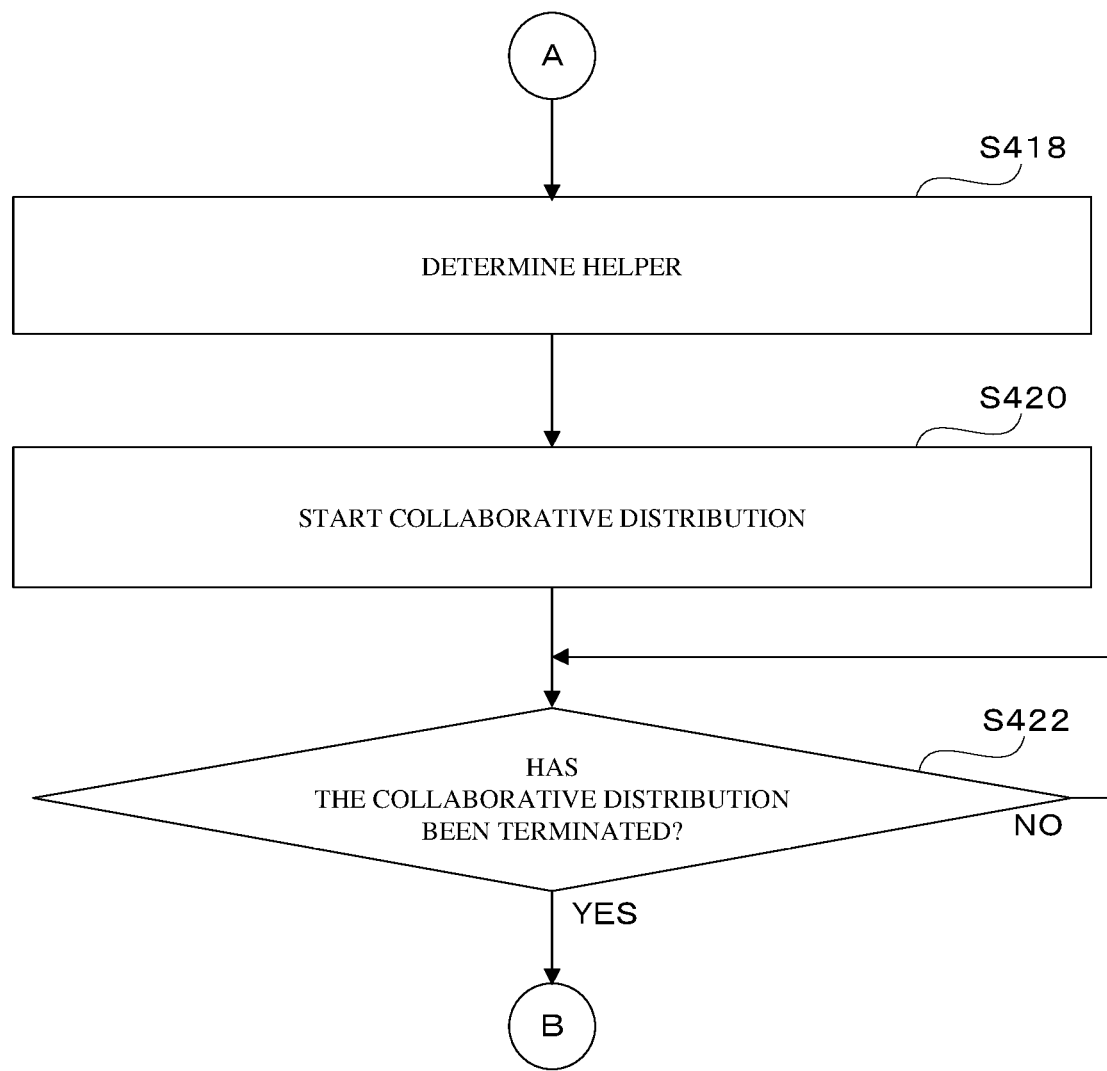
FIG. 7B is a flowchart showing an example of the motion performed in the video distribution system 1 shown in FIG. 1.

FIG. 7A and FIG. 7B are flowcharts showing an example of the motion performed in the video distribution system 1 shown in FIG. 1. In the present embodiment, for example, the description will be made hereinafter on the assumption that the number of users performing collaborative distribution with the first distributor is singular (second distributor). However, the number of users performing the collaborative distribution with the first distributor may be not singular but plural.

First, referring to FIG. 7A, in S402, in accordance with the operation of the distributor (first distributor), the terminal 10 (first distributor terminal 11A) starts and executes the video distribution application.

In S404, the first distributor terminal 11A generates the first video including the animation of the avatar object of the first distributor on the basis of the motion data regarding the motion of the first distributor. Thus, the display unit 130 of the first distributor terminal 11A displays the first video including the animation of the avatar object of the first distributor. Then, the first distributor terminal 11A transmits the generated first video to the distribution server device 20A1 of the distribution server system 20A. The distribution server device 20A1 distributes the first video received from the first distributor terminal 11A to each viewer terminal 12 executing the video viewing application. Thus, the display unit 130 of the viewer terminal 12 of each viewer also displays the first video.

In S406, when the first distributor taps or the like an icon 406 (not illustrated) called "game" displayed on the display unit 130 of the first distributor terminal 11A, the first distributor terminal 11A executes the browser function installed in the video distribution application. Thus, in S408, by accessing the web server system 20B in a state where the video distribution application is executed (e.g., the first video is distributed toward each viewer terminal 12), the first distributor terminal 11A can receive an HTML5 document in which a game program is incorporated.

In S410, by executing the game program incorporated in the received HTML5 document, the first distributor terminal 11A can generate a video (second video) regarding the game.

In S412, using the first distributor terminal 11A, the first distributor independently distributes the game, and the processing in S414 is executed. In S412, the first distributor and the viewer operate their own terminals 10 to start the browser, receive game rendering data from the server device 20 (e.g., web server system 20B), and view the game via the game screen (Web View). At this time, the server device 20 transmits the game rendering data to the terminal 10. In the case of distributing a game, information (data) such as game operation information and calculation information are transmitted/received between the server device 20 (e.g., web server system 20B) and the terminal 10.

In S414, the server device 20 determines whether or not to have received the fourth data from the first distributor terminal 11A. If determined to have received the fourth data from the first distributor terminal 11A (YES in S414), the server device 20 transmits data notifying the relief request in S414 to the viewer terminal 12 viewing the distribution distributed by the first distributor, and performs the processing in S416. On the other hand, if the server device 20 determines to have not received the fourth data from the first distributor terminal 11A (NO in S414), the processing of S414 is repeated.

The fourth data is, for example, data requesting the first distributor to invite a user to participate in the game. The fourth data includes data requesting that at least one other avatar be included in the second video together with the avatar of the first distributor. The fourth data is transmitted from the first distributor terminal 11A, for example, when the first distributor operates a character to play a predetermined game using the first distributor terminal 11A, and in a case where the parameter of the character shows an undesirable value in the game. The fourth data is transmitted to, for example, an external social networking service (SNS).

In S416, the server device 20 determines whether or not there has been a response to the relief request from the viewer terminal 12. If the server device 20 determines that there has been a response to the relief request from the viewer terminal 12 (YES in S416), the processing of S418 is executed. On the other hand, if the server device 20 determines that there has been no response to the relief request from the viewer terminal 12 (NO in S416), the processing of S416 is repeated. The determination as to whether or not there has been a response to the relief request from the viewer terminal 12 is performed by, for example, the server device 20 determining whether or not to have received sixth data regarding the response to the relief request from the viewer terminal 12. The sixth data is data transmitted from the viewer terminal 12 of at least one viewer.

The above description has described the example in which the server device 20 determines in S416 whether or not there has been a response to the relief request from the viewer terminal 12. However, the present invention is not limited to this. For example, when receiving the fourth data from the first distributor terminal 11A (YES in S414), the server device 20 may acquire the fifth data stored in the storage unit 210 instead of performing the determination in S416.

In S418, the server device 20 decides one user as a relief user on the basis of, for example, the fifth data or the sixth data. In S418, the server device 20 may decide a plurality of users as relief users on the basis of, for example, the fifth data or the sixth data. One or a plurality of users to be decided as relief users are decided from among viewers viewing the distribution distributed by the first distributor, for example. At least any of the fifth data and the sixth data can include data in which the priority of at least one other avatar to be included in the second video together with the avatar of the first distributor is assigned to each of at least one user.

In S418, when deciding one user as a relief user on the basis of the fifth data, the server device 20 performs display control of including, in the second video together with the avatar of the first distributor, among the avatars of at least one user, the avatar of a user having the largest number of times of distribution of the game distributed in the past, the avatar of a user having the largest number of times of view of the game viewed in the past, the avatar of the highest level, the avatar of a user with the highest ranking, the avatar of a user having the largest number of times of distribution of, together with the first distributor, the game distributed in the past by the first distributor, the avatar of a user having the largest number of times of view of the game executed in the past by the first distributor, the avatar of a user having the largest number of belonging to events in the game executed in the past by the first distributor, the avatar of a user having the largest total number of messages transmitted to the first distributor and received from the first distributor, the avatar of a user having given the largest number of tokens (gifts) to the first distributor, or the avatar of a user decided to have the highest accumulation of the values of the tokens (gifts) given to the first distributor. The accumulation of the values of the tokens (gifts) given to the first distributor is decided on the basis of the total sum of the prices of the tokens (gifts) given to the first distributor or the total sum of the consumption points consumed in the game. In S418, when deciding one user as a relief user on the basis of the fifth data, the server device 20 may decide the avatars of at least one user in descending order of the length of the viewing time of the collaborative distribution. Here, for example, it is assumed that the first viewer, the second viewer, and the third viewer are viewing an identical distribution, and the first viewer, the second viewer, and the third viewer are viewing the distribution for the first length of time, the second length of time, and the third length of time, respectively. Here, it is assumed that the first length of time is longer than the second length of time, and the second length of time is longer than the third length of time. In this case, the first viewer, the second viewer, and the third viewer respond to the relief request in S416, whereby the first viewer, having the longest viewing time in S418, is decided as the relief user. Then, since the second viewer and the third viewer continue to view the distribution and the viewing time of the second viewer is longer than that of the third viewer, the second viewer can participate in a predetermined distribution as a relief user in preference to the third viewer. Thus, even when having failed to participate in a predetermined distribution as a relief user at a predetermined timing, the viewer can participate in the distribution as the relief user, by continuing to view the distribution, in preference in descending order of the length of viewing time of the distribution at a timing after the predetermined timing. As described above, it is possible to reduce the possibility that a viewer not selected as a relief user among the viewers viewing a predetermined distribution leaves the distribution (stops viewing the distribution).

In S418, when the server device 20 decides a plurality of users as relief users on the basis of the fifth data, the server device 20 determines, for example, whether or not the number of users as candidates for the relief users exceeds the upper limit number of avatars that can be included in the second video together with the first distributor. Next, for example, if the number of users as candidates for the relief users exceeds the first upper limit value, the server device 20 decides to include the avatar objects of the number users equal to or less than the first upper limit value in the second video together with the avatar object of the first distributor on the basis of the priority included in the data stored in the storage unit 210 of the server device 20. For example, if the number of users as candidates for the relief users is equal to or less than the first upper limit value, the server device 20 decides to include the avatar objects of the plurality of users in the second video together with the avatar object of the first distributor on the basis of the data stored in the storage unit 210 of the server device 20. Here, for example, in a case where the number of users as candidates for the relief users is equal to or less than the first upper limit value and in a case where a new user as a candidate for the relief user appears, the server device 20 may include the avatar object of the new user in the second video together with the avatar object of the first distributor. Note that the case where a new user as a candidate for the relief user appears means that a new user starts viewing the distribution when distribution is performed by the first distributor, for example.

In S418, when the server device 20 decides, on the basis of the fifth data, a plurality of users as relief users, if the number of at least one other avatar exceeds the first upper limit value and it is decided that the avatars of the number of people equal to or less than the first upper limit value from among at least one other avatar are included in the second video together with the avatar of the first distributor, the processor is caused to function so as to distribute at least any of the first video and the second video to the users corresponding to the avatars that are not included in the second video together with the avatar of the first distributor from among at least one other avatar.

In S418, when the server device 20 decides one user as a relief user on the basis of the sixth data, the server device 20 decides the user whose transmission timing of the sixth data is the earliest from among a plurality of viewers, for example. In this case, the sixth data may include data regarding the transmission timing of the data transmitted from the viewer terminal 12.

In S420, the server device 20 starts collaborative distribution by the first distributor and the one or plurality of users decided in S418. In a case where the collaborative distribution is related to a joint performance of avatars, when the processing of S420 is executed, for example, the avatar of the first distributor and the avatar of the second distributor are displayed in the first video instead of only the avatar of the first distributor being displayed in the first video. Then, the terminal 10 receives data regarding the execution of the collaborative distribution of S420 from the server device 20, and performs display control of including, in the first video, the avatar operated by the second distributor in addition to the avatar operated by the first distributor on the basis of the data. If the collaborative distribution is related to the distribution of the game, after the processing of S420 is executed, the operation contents in the first distributor terminal 11A and the second distributor terminal 11B are transmitted to the web server system 20B. The first distributor, the second distributor, and each viewer can operate their own terminal 10 to start a browser, and can view the game via the game screen (Web View). Of the server devices 20, for example, the web server system 20B includes a server device (e.g., game server device 20B1) that integrates game operation information of the user participating in the game. The server device integrates the operation information for operating each terminal 10 and transmits the result of the calculation to the host distributor (first distributor). The calculation is performed on the game screen (Web View) of the terminal 10 of the host distributor (first distributor), and the result is transmitted to the server device 20 (e.g., web server system 20B), and subsequently transmitted to each terminal 10. Each of the terminals 10 includes the first distributor terminal 11A and terminals operated by the distributor (e.g., second distributor terminal 11B) performing collaborative distribution with the first distributor and the game viewer. Voice data are transmitted/received between the collaboration server device 20A4 and the first distributor terminal 11A and/or the second distributor terminal 11B.

When the collaborative distribution is started in S420, for example, the parameter of the avatar of the first distributor is changed, and the parameter of at least one other avatar to be included in the second video together with the avatar of the first distributor is changed.

Alternatively, in S420, on the basis of the lapse of the first length of time after the collaborative distribution is started, the avatar to be included in the second video together with the avatar of the first distributor is changed. This enables the viewer to recognize that the avatar to be included in the second video together with the avatar of the first distributor is changed over time. Therefore, by continuing to view the distribution of the first distributor, the viewer can have a sense of anticipation to participate in the distribution of the first distributor as a relief user and perform collaborative distribution together with the first distributor in the future. This can motivate the viewer to continue viewing the distribution of the first distributor.

Thus, by performing display control of including at least one other avatar in the second video together with the avatar of the first distributor, the first distributor and the user corresponding to at least one other avatar can jointly perform distribution.

Next, in S422, the server device 20 determines whether or not the collaborative distribution by the first distributor and the second distributor has been ended. If the server device 20 determines in S422 that the collaborative distribution by the first distributor and the second distributor has been ended (YES in S422), the processing in S414 is executed. On the other hand, if the server device 20 determines in S422 that the collaborative distribution by the first distributor and the second distributor has not been ended (NO in S422), the processing in S422 is repeated. The condition for ending the collaboration distributor in S422 is, for example, either a case where the conditions in the game played by the collaborative distribution are satisfied or a case where a predetermined length of time has elapsed after the start of the collaborative distribution. Here, the above-mentioned "conditions in the game" are, for example, conditions such as knocking down a character different from the character to be operated in the stage prepared in the game, acquiring a predetermined item in the stage, moving the character to be operated in the stage to a predetermined position, or that the parameter of the character to be operated in the stage is equal to or greater than a predetermined value or less than the predetermined value. The knocking down a character different from the character to be operated in the stage prepared in the game, acquiring a predetermined item in the stage, and moving the character to be operated in the stage to a predetermined position can correspond to clearing the stage. It can correspond to the death of the character to be operated that the parameter of the character to be operated in the stage is equal to or greater than a predetermined value or less than the predetermined value. The above-mentioned "predetermined length of time" is decided in accordance with the familiarity of the plurality of distributors who distribute by the collaborative distribution.

The familiarity is decided, for example, on the basis of at least any of the number of actual collaborations between the first distributor and the second distributor, the period during which the first distributor follows the second distributor, the period during which the second distributor follows the first distributor, the number of comments made between the first distributor and the second distributor, and the number of direct messages (DM) made between the first distributor and the second distributor.

Here, it is assumed that the more the number of actual collaborations between the first distributor and the second distributor is, the higher the familiarity is set and the longer the predetermined length of time is set. It is assumed that the longer the period during which the first distributor follows the second distributor is, the higher the familiarity is set and the longer the predetermined length of time is set. It is assumed that the longer the period during which the second distributor follows the first distributor is, the higher the familiarity is set and the longer the predetermined length of time is set. It is assumed that the more the number of comments made between the first distributor and the second distributor is, the higher the familiarity is set and the longer the predetermined length of time is set. It is assumed that the more the number of direct messages (DM) made between the first distributor and the second distributor is, the higher the familiarity is set and the longer the predetermined length of time is set.

In the above description, an example of sequentially executing S402 to S412 described in FIG. 7A has been described, but the present invention is not limited thereto. For example, a part of the processing in S402 to S412 described in FIG. 7A may be omitted. The processing of S414 to S422 can be performed by one or a plurality of components constituting the server device 20 within a range where the processing of S414 to S422 can be executed.

The first video and the second video may be displayed in parallel, superimposed, switched, or combined on the screen of the terminal 10. Display control may be performed to include at least one other avatar in the first video and/or the second video together with the avatar of the first distributor.

An example of performing display control of extracting at least one other avatar and including at least one other avatar in the second video together with the avatar of the first distributor has been described. However, the present invention is not limited thereto, and display control of extracting at least one other avatar and including at least one other avatar in the first video together with the avatar of the first distributor may be performed.

In the above description, an example in which the first distributor independently performs distribution has been described in S412, but the present invention is not limited thereto. In S412, the first distributor terminal 11A may transmit the second video (game screen) to the distribution server device 20A1 of the distribution server system 20A. In this case, the distribution server device 20A1 can distribute the second video received from the first distributor terminal 11A to each viewer terminal 12 executing the video viewing application.

As described above, according to the present disclosure, by being executed by at least one processor, a processor is caused to function so as to distribute the first video including motion data regarding the motion of the first distributor or an animation of the avatar of the first distributor generated on the basis of the motion data and the second video regarding the game generated on the basis of the operation data regarding the operation of the first distributor to at least one viewer terminal 12 of the viewer via the communication line, determine whether or not the fourth data has been transmitted from the first distributor, and, if determining that the fourth data has been transmitted from the first distributor, perform display control of extracting at least one other avatar on the basis of at least any of the fifth data regarding at least one user in a game executed in the past by at least one user different from the first distributor and the sixth data regarding data transmitted from the viewer terminal 12 of at least one viewer, and including at least one other avatar in the second video together with the avatar of the first distributor. Therefore, it is possible to increase the expandability of the distribution mode more than ever.

(Various Aspects)

A computer program according to the first aspect can be "a computer program causing, by being executed by at least one processor, the processor to function so as to: distribute a first video and a second video toward a viewer terminal of at least one viewer via a communication line, the first video including either motion data regarding a motion of a first distributor or an animation of an avatar of the first distributor generated on the basis of the motion data, the second video regarding a game generated on the basis of operation data regarding an operation of the first distributor; determine whether or not first data has been transmitted from the first distributor; extract at least one other avatar on the basis of at least one of second data and third data in a case where it is determined that the first data has been transmitted from the first distributor, the second data regarding at least one user in a game performed in the past by the at least one user different from the first distributor, the third data regarding data transmitted from a viewer terminal of the at least one viewer; and perform display control of including the at least one other avatar and an avatar of the first distributor in the second video.

In the computer program according to the second aspect, in which in the first aspect, "the computer program causes the processor to function so that the second video is a video regarding a game generated on the basis of operation data regarding an operation of the first distributor using received web page".

In the computer program according to the third aspect, in which in the first aspect or the second aspect, "the computer program causes the processor to function so that the first distributor and a user corresponding to the at least one other avatar perform the game by performing display control of including the at least one other avatar and an avatar of the first distributor in the second video".

In the computer program according to the fourth aspect, in which in any of the first to the third aspects, "the computer program causes the processor to function so that the first data is transmitted to an external social networking service (SNS)".

In the computer program according to the fifth aspect, in which in any of the first to the fourth aspects, "the computer program causes the processor to function so that the first data includes data requesting that the at least one other avatar be included in the second video together with an avatar of the first distributor".

In the computer program according to the sixth aspect, in which in any of the first to the fifth aspects, "the computer program causes the processor to function so that at least one of the second data and the third data includes data in which the priority of at least one other avatar to be included in the second video together with an avatar of the first distributor is assigned to each of the at least one user".

In the computer program according to the seventh aspect, in which in the sixth aspect, "a first upper limit value being a number of an upper limit of an avatar that can be included in the second video together with an avatar of the first distributor is defined and the computer program causes the processor to function so as to: determine whether or not first data has been transmitted from the first distributor; determine whether or not the number of the at least one other avatar exceeds the first upper limit value in a case where it is determined that the first data has been transmitted from the first distributor; determine to include an avatar of the number users equal to or less than the first upper limit value from among the at least one other avatar in the second video together with an avatar of the first distributor on the basis of at least one of the priority included in the second data and the priority included in the third data in a case where the number of the at least one other avatar is equal to or greater than the first upper limit value; determine to include the at least one other avatar in the second video together with an avatar of the first distributor on the basis of at least one of the priority included in the second data and the priority included in the third data in a case where the number of the at least one other avatar is equal to or less than the first upper limit value".

In the computer program according to the eighth aspect, in which in the seventh aspect, "the computer program causes the processor to function so as to distribute at least any of the first video and the second video to a user corresponding to an avatar that is not included in the second video together with an avatar of the first distributor from among the at least one other avatar if the number of the at least one other avatar exceeds the first upper limit value and it is decided that an avatar of the number of people equal to or less than the first upper limit value from among the at least one other avatar are included in the second video together with an avatar of the first distributor".

In the computer program according to the ninth aspect, in which in any of the first to the eighth aspects, "the computer program causes the processor to function so that the second data includes at least one of data indicating a parameter in a game that the at least one user has ever distributed or viewed in the past and data indicating a relationship between the at least one user and the first distributor".

In the computer program according to the tenth aspect, in which in the ninth aspect, "the computer program causes the processor to function so that the second data includes at least any of the number of times of distribution of a game distributed in the past by the at least one user, the number of times of view of a game viewed in the past by the at least one user, data indicating the level of the avatar of the at least one user, data indicating the ranking of the at least one user, data indicating the number of times of distribution of the game distributed by the at least one user together with the first distributor in a game distributed in the past by the first distributor, data indicating the number of times of view of the game distributed in the past by the first distributor viewed by the at least one user, data indicating the history in which at least one user has belonged to an event in a game executed in the past by the first distributor, data indicating whether or not at least one user follows the first distributor, data indicating the total number of messages transmitted between at least one user and the first distributor, and data indicating the amount of gifts and the content of gifts given to the first distributor by at least one user in a game distributed in the past by the first distributor".

In the computer program according to the eleventh aspect, in which in the tenth aspects, "the computer program causes the processor to function so as to perform, on the basis of the second data, display control of including, in the second video together with an avatar of the first distributor, among avatars of the at least one user, an avatar of a user having the largest number of times of distribution of a game distributed in the past, an avatar of a user having the largest number of times of view of a game viewed in the past, an avatar of the highest level, an avatar of a user with the highest ranking, an avatar of a user having the largest number of times of distribution of, together with the first distributor, a game distributed in the past by the first distributor, an avatar of a user having the largest number of times of view of a game executed in the past by the first distributor, an avatar of a user having the largest number of belonging to events in a game executed in the past by the first distributor, an avatar of a user having the largest total number of messages transmitted to the first distributor and received from the first distributor, an avatar of a user having given the largest number of gifts to the first distributor, or an avatar of a user decided to have the highest accumulation of the values of gifts given to the first distributor".

In the computer program according to the twelfth aspect, in which in the eleventh aspect, "the computer program causes the processor to function so that the accumulation of the values of the gifts given to the first distributor is decided on the basis of the total sum of prices of gifts given to the first distributor or the total sum of consumption points consumed in the game".

In the computer program according to the thirteenth aspect, in which in any of the first to the ninth aspects, "the computer program causes the processor to function so that the third data includes data regarding a transmission timing of data transmitted from a viewer terminal of the at least one viewer".

In the computer program according to the fourteenth aspect, in which in the thirteenth aspect, "the computer program causes the processor to function so as to perform display control of including an avatar of a user whose transmission timing is the earliest among the at least one user and an avatar of the first distributor in the second video".

In the computer program according to the fifteenth aspect, in which in any of the first to the fourteenth aspects, "the computer program causes the processor to function so that an avatar to be included in the second video together with an avatar of the first distributor is changed on the basis of a change of a parameter of an avatar of the first distributor after the display control, on the basis of a change of a parameter of the at least one other avatar to be included in the second video together with an avatar of the first distributor after the display control, or on the basis of the lapse of first length of time after the display control.

A computer program according to the sixteenth aspect can be "a computer program causing, by being executed by at least one processor, the processor to function so as to: receive a first video and a second video toward a viewer terminal of at least one viewer via a communication line, the first video including either motion data regarding a motion of a first distributor or an animation of an avatar of the first distributor generated on the basis of the motion data, the second video regarding a game generated on the basis of operation data regarding an operation of the first distributor; determine whether or not first data has been transmitted from the first distributor; extract at least one other avatar on the basis of at least one of second data and third data in a case where it is determined that the first data has been transmitted from the first distributor, the second data regarding at least one user in a game performed in the past by the at least one user different from the first distributor, the third data regarding data transmitted from a viewer terminal of the at least one viewer; and receive a second video including the at least one other avatar and an avatar of the first distributor in a case where a display control to include the at least one other avatar and an avatar of the first distributor in the second video is performed".

In the computer program according to the seventeenth aspect, in which in any of the first to the sixteenth aspects, "the communication line includes the Internet".

In the computer program according to the eighteenth aspect, in which in any of the first to the seventeenth aspects, "the at least one processor includes a central processing unit (CPU), a microprocessor, and/or a graphics processing unit (GPU)".

In the computer program according to the nineteenth aspect, in which in any of the first to the eighteenth aspects, "the at least one processor is mounted on a smartphone, a tablet, a mobile phone, and/or a personal computer".

A method according to the twentieth aspect can be "a method executed by at least one processor executing computer-readable instructions, the method including steps of, by executing the instructions with the processor, distributing a first video and a second video toward a viewer terminal of at least one viewer via a communication line, the first video including either motion data regarding a motion of a first distributor or an animation of an avatar of the first distributor generated on the basis of the motion data, the second video regarding a game generated on the basis of operation data regarding an operation of the first distributor, determining whether or not first data has been transmitted from the first distributor, extracting at least one other avatar on the basis of at least one of second data and third data in a case where it is determined that the first data has been transmitted from the first distributor, the second data regarding at least one user in a game performed in the past by the at least one user different from the first distributor, the third data regarding data transmitted from a viewer terminal of the at least one viewer, and performing display control of including the at least one other avatar and an avatar of the first distributor in the second video".

A method according to the twenty-first aspect can be "a method executed by at least one processor executing computer-readable instructions, the method including steps of, by executing the instructions with the processor, receiving a first video and a second video toward a viewer terminal of at least one viewer via a communication line, the first video including either motion data regarding a motion of a first distributor or an animation of an avatar of the first distributor generated on the basis of the motion data, the second video regarding a game generated on the basis of operation data regarding an operation of the first distributor; determining whether or not first data has been transmitted from the first distributor, extracting at least one other avatar on the basis of at least one of second data and third data in a case where it is determined that the first data has been transmitted from the first distributor, the second data regarding at least one user in a game performed in the past by the at least one user different from the first distributor, the third data regarding data transmitted from a viewer terminal of the at least one viewer, and receiving a second video including the at least one other avatar and an avatar of the first distributor in a case where a display control to include the at least one other avatar and an avatar of the first distributor in the second video is performed".

In the method according to the twenty-second aspect, in which in the twentieth aspect or the twenty-first aspect, "the communication line includes the Internet".

In the method according to the twenty-third aspect, in which in any of the twentieth to twenty-second aspects, "the at least one processor includes a central processing unit (CPU), a microprocessor, and/or a graphics processing unit (GPU)".

A server device according to the twenty-fourth aspect can be "a server device comprising at least one processor, wherein the processor is configured to: distribute a first video and a second video toward a viewer terminal of at least one viewer via a communication line, the first video including either motion data regarding a motion of a first distributor or an animation of an avatar of the first distributor generated on the basis of the motion data, the second video regarding a game generated on the basis of operation data regarding an operation of the first distributor; determine whether or not first data has been transmitted from the first distributor; extract at least one other avatar on the basis of at least one of second data and third data in a case where it is determined that the first data has been transmitted from the first distributor, the second data regarding at least one user in a game performed in the past by the at least one user different from the first distributor, the third data regarding data transmitted from a viewer terminal of the at least one viewer; and perform display control of including the at least one other avatar and an avatar of the first distributor in the second video".

A server device according to the twenty-fifth aspect can be "a server device comprising at least one processor, wherein the processor is configured to: distribute a first video and a second video toward a viewer terminal of at least one viewer via a communication line, the first video including either motion data regarding a motion of a first distributor or an animation of an avatar of the first distributor generated on the basis of the motion data, the second video regarding a game generated on the basis of operation data regarding an operation of the first distributor, and wherein the computer program causes the processor to function so that a distributor terminal of the first distributor is configured to: determine whether or not first data has been transmitted from the first distributor; extract at least one other avatar on the basis of at least one of second data and third data in a case where it is determined that the first data has been transmitted from the first distributor, the second data regarding at least one user in a game performed in the past by the at least one user different from the first distributor, the third data regarding data transmitted from a viewer terminal of the at least one viewer; and perform display control of including the at least one other avatar and an avatar of the first distributor in the second video".

In the server device according to the twenty-sixth aspect, in which in the twenty-fourth aspect or the twenty-fifth aspect, "the communication line includes the Internet".

In the server device according to the twenty-seventh aspect, in which in any of the twenty-fourth to the twenty-sixth aspects, "the at least one processor includes a central processing unit (CPU), a microprocessor, and/or a graphics processing unit (GPU)".

Figure 8:
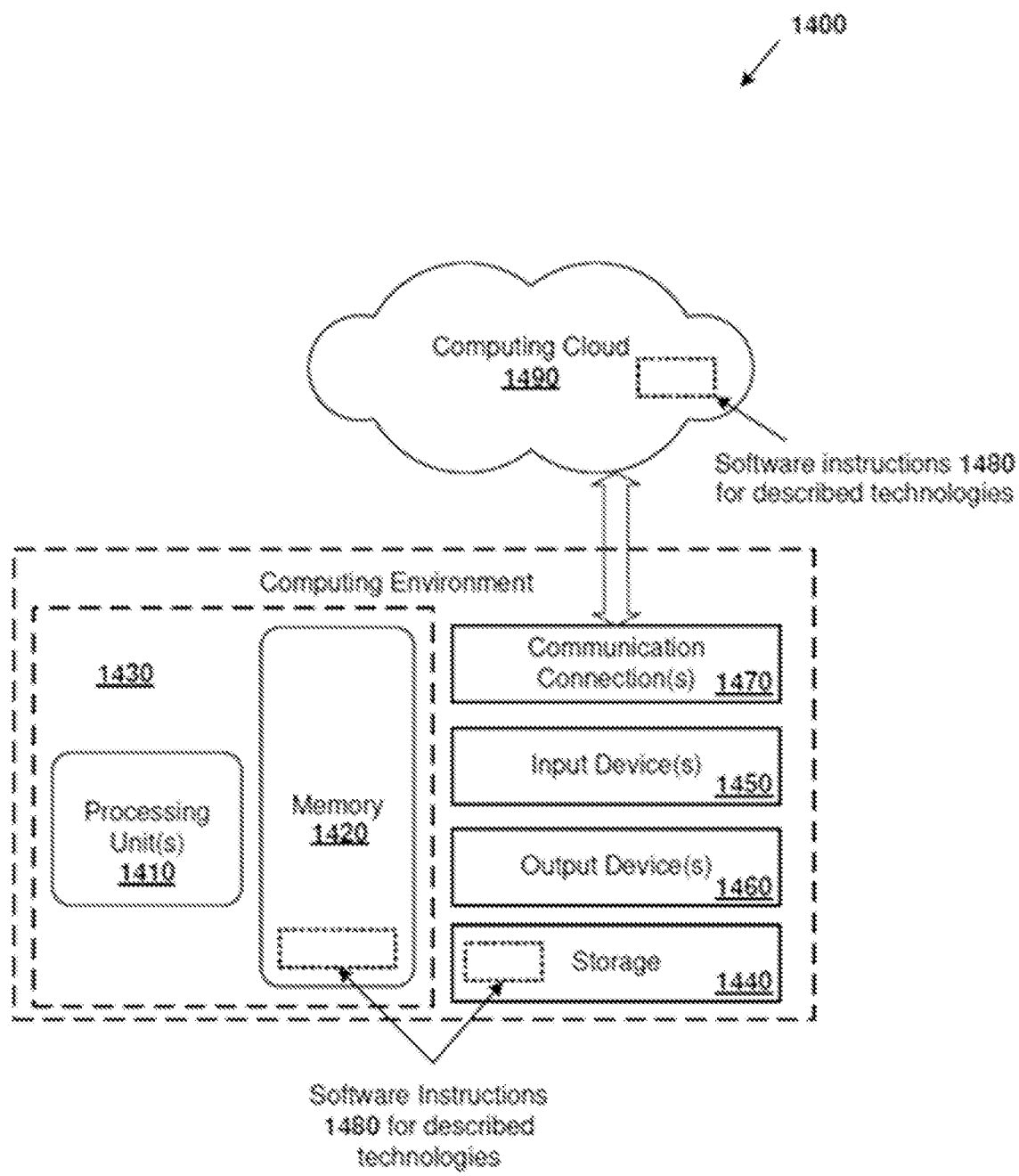
FIG. 8 is a block diagram showing a computing environment 1400.

FIG. 8 illustrates a generalized example of a suitable computing environment 1400 in which described embodiments, techniques, and technologies, including transmitting and using tokens to render video in a computing environment, can be implemented. For example, the computing environment 1400 can implement any of the terminal devices (or distributors or viewers) or the distribution server system, etc., as described herein.

The computing environment 1400 is not intended to suggest any limitation as to scope of use or functionality of the technology, as the technology may be implemented in diverse general-purpose or special-purpose computing environments. For example, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 8, the computing environment 1400 includes at least one central processing unit 1410 and memory 1420. In FIG. 8, this most basic configuration 1430 is included within a dashed line. The central processing unit 1410 executes computer-executable instructions and may be a real or a virtual processor. In a multi-processing system, multiple processing units execute computer-executable instructions to increase processing power and as such, multiple processors can be running simultaneously. The memory 1420 may be volatile memory (e.g., registers, cache, RAM), non-volatile memory (e.g., ROM, EEPROM, flash memory, etc.), or some combination of the two. The memory 1420 stores software 1480, images, and video that can, for example, implement the technologies described herein. A computing environment may have additional features. For example, the computing environment 1400 includes storage 1440, one or more input devices 1450, one or more output devices 1460, and one or more communication connections 1470. An interconnection mechanism (not shown) such as a bus, a controller, or a network, interconnects the components of the computing environment 1400. Typically, operating system software (not shown) provides an operating environment for other software executing in the computing environment 1400, and coordinates activities of the components of the computing environment 1400.

The storage 1440 may be removable or non-removable, and includes magnetic disks, magnetic tapes or cassettes, CD-ROMs, CD-RWs, DVDs, or any other medium which can be used to store information (data) and that can be accessed within the computing environment 1400. The storage 1440 stores instructions for the software 1480, plugin data, and messages, which can be used to implement technologies described herein.

The input device(s) 1450 may be a touch input device, such as a keyboard, keypad, mouse, touch screen display, pen, or trackball, a voice input device, a scanning device, or another device, that provides input to the computing environment 1400. For audio, the input device(s) 1450 may be a sound card or similar device that accepts audio input in analog or digital form, or a CD-ROM reader that provides audio samples to the computing environment 1400. The output device(s) 1460 may be a display, printer, speaker, CD-writer, or another device that provides output from the computing environment 1400.

The communication connection(s) 1470 enable communication over a communication medium (e.g., a connecting network) to another computing entity. The communication medium conveys information (data) such as computer-executable instructions, compressed graphics information (compressed graphics data), video, or other data in a modulated data signal. The communication connection(s) 1470 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed terminals and servers. In a virtual host environment, the communication(s) connection(s)s can be a virtualized network connection provided by the virtual host.

Some embodiments of the disclosed methods can be performed using computer-executable instructions implementing all or a portion of the disclosed technology in a computing cloud 1490. For example, terminals can execute in the computing environment while servers can be located in the computing cloud 1490.

Computer-readable media are any available media that can be accessed within a computing environment 1400. By way of example, and not limitation, with the computing environment 1400, computer-readable media include memory 1420 and/or storage 1440. As should be readily understood, the term computer-readable storage media includes the media for data storage such as memory 1420 and storage 1440, and not transmission media such as modulated data signals.

5. Variations

In the various embodiments described above, a case where in order for the distributor terminal 11 to generate a video (second video) regarding a game, an HTML (HTML5 in particular) document in which a game program is incorporated is received from the web server system 20B has been described. However, instead of the configuration of receiving, from the web server system 20B, an HTML document in which a game program is incorporated from the web server system 20B, the distributor terminal 11 can also generate the second video including a screen regarding the game by executing the installed video distribution application to receive necessary information (necessary data) from a data server device not illustrated (or a certain server device not illustrated included in the distribution server system 20A).

In the various embodiments described above, the distributor terminal 11 may be a smartphone or the like used by a general user or may be a dedicated terminal placed in a studio or the like. In this case, at least one server device from among a distribution server device 20a, a DB server device 20b, and a game API server device 20c (furthermore, a web server system 20B) included in the distribution server system 20A may be provided together with the dedicated terminal in the studio or the like.

In the various embodiments described above, a case in which, on the basis of motion data regarding the motion of a distributor and voice data regarding the voice of the distributor, the distributor terminal 11 generates a video including an animation including an avatar object of this distributor, and transmits this video to the server device 20 has been described. However, the distributor terminal 11 may transmit the motion data regarding the motion of the distributor and the voice data regarding the voice of the distributor to the server device 20, and the server device 20 may generate a video on the basis of this motion data and the voice data and distribute the video to each viewer terminal 12. This can reduce the amount of information (data) transmitted from the distributor terminal 11 to the server device 20.

The distributor terminal 11 may transmit the motion data regarding the motion of the distributor and the voice data regarding the voice of the distributor to a separately provided server device, this separate server device may generate a video on the basis of the motion data and the voice data and return it to the distributor terminal 11, and the distributor terminal 11 may transmit the received video to the server device 20. This can reduce the amount of information (data) transmitted from the distributor terminal 11 to the separately provided server device 20.

The distributor terminal 11 may transmit the motion data regarding the motion of the distributor and the voice data regarding the voice of the distributor to each viewer terminal 12 via the server device 20 or the separately provided server device, and each viewer terminal 12 may generate (render) and display a video on the basis of the received motion data and voice data. This can reduce the amount of information (data) transmitted from the server device 20 or the separately provided server device to each viewer terminal 12.

In any of the above cases, the generation of the video on the basis of the motion data and the voice data transmitted by the distributor terminal 11 may be shared by at least two devices from among the server device 20, the separate server device, and each viewer terminal 12. In either case, the device responsible for generation of the video can receive and store information (data) such as an image regarding the avatar object to be operated from, for example, the server device 20 or the like.

In the various embodiments described above, the motion of each of the terminals 10 described above can be executed similarly by the studio unit 30 having a similar configuration to that of the terminal 10. In this case, the studio unit 30A illustrated in FIG. 1 can have a similar function to that of the terminal 10 for distributing a video. Similarly, the studio unit 30B illustrated in FIG. 1 can have a similar function to that of the terminal 10 for viewing a video. Furthermore, the motion of each of the server devices 20 described above can be executed also by the studio unit 30 having the similar configuration to that of the server device 20.

The various embodiments described above can be used in combination with each other as long as they do not cause inconsistencies or inconveniences.

In general, if a game program is installed in the terminal 10, or if a game program is incorporated in a video distribution application installed in the terminal 10, execution of a new game requires the terminal 10 to have a new game program installed or have a video distribution application in which the new game program is incorporated installed. In this case, the game program creator needs to prepare a game program corresponding to each of the plurality of OSs, and therefore, there is a problem that the man-hour for the production of the game program increases. On the other hand, from the viewpoint of the user, it is necessary to download a new game program and/or update an existing game program in order to obtain a new game, there is a problem that communication load, communication cost, time, and labor are required.

In S324, if at least one current parameter of the avatar of the first distributor has been changed on the basis of the second data, or if the avatar of the first distributor and the avatar of a user other than the first distributor are displayed in the second video on the basis of the second data, the parameter regarding the avatar of the user (helper) can be changed. The change of the parameter means, for example, a change to a parameter more advantageous for the progress of the game than the current parameter. Instead of changing the parameter regarding the avatar of the user, a token (gift) can be given to the user. Thus, the reward for being selected in S322 and S324 can be given to the user. The degree of change of the parameter and the content of the token (gift) are decided in accordance with the degree of contribution of the user (helper). For example, the higher the degree of contribution of the user (helper) is, the greater the degree of change of the parameter described above can become so as to be more advantageous to the progress of the game. For example, the higher the degree of contribution of the user (helper) is, the larger the number of tokens (gifts), the higher the value of tokens (gifts), the larger the number of types of tokens (gifts), and/or the higher the level of tokens (gifts) can be.

An example of executing the processing of S322 and thereafter executing the processing of S324 in a case of YES in S318 has been described. However, in a case of YES in S318 and before executing the processing of S322, or after executing the processing of S322 and before executing the processing of S324, the server device 20 may count the number of viewers of the game independently distributed by the first distributor. Then, the server device 20 may determine whether or not the number of viewers of the game independently distributed by the first distributor is equal to or greater than a predetermined number of viewers, and only in a case where the number of viewers falls below the predetermined number of viewers, execute the subsequent processing (S322 or S324). Alternatively, the server device 20 may determine whether or not the number of viewers of the game independently distributed by the first distributor has become smaller than the number of viewers at the time of collaborative distribution by a predetermined number or more, and only in a case where the number of viewers has become smaller than the number of viewers by the predetermined number or more, execute the subsequent processing (S322 or S324). The number of viewers at the time of collaborative distribution is, for example, any of the maximum number of viewers, the minimum number of viewers, and the average number of viewers at the time of collaborative distribution.

In the above description, an example in which the predetermined processing described in S324 is performed on the basis of the second data in the case where the first distributor independently distributes after the second distributor distributing together with the first distributor stops and leaves the distribution in S316 has been described. However, the present invention is not limited thereto. For example, the processing of S322 and S324 may be performed in the case where there are a plurality of distributors (guests) distributing together with the first distributor in S316, and after at least one guest of the plurality of guests stops and leaves the distribution, both the first distributor and the remaining guest are distributing the game.

In the above description, an example of sequentially executing S302 to S318 described in FIG. 6A has been described. However, the present invention is not limited to this, and at least any of processing of S304 to S312 may be omitted.

The technique of the present disclosure is applicable to, for example, a role-playing game, a social simulation game, a shooter game, an action game, a card game, Mahjong, Go, Othello, a puzzle game, a quiz game, a sports game, and/or a board game. Here, the user (helper) regarding the second data extracted in S324 can assist the first distributor when the first distributor plays the game, as follows, for example. For example, if the first distributor plays a role-playing game, a social simulation game, and/or a shooter game, the user gives the first distributor an example of how to proceed with the game. For example, in a case where the first distributor plays an action game in a situation where the first distributor fights with a predetermined character in the action game, the user participates in the fight so as to support the first distributor. For example, in a case where the first distributor plays a card game, the first distributor can use the special skill that the user has. For example, in a case where the first distributor plays a sports game in a situation where the first distributor plays a match with a predetermined opponent (team) in the sports game, the user participates in the match so as to support the first distributor. For example, if the first distributor plays a role-playing game, a social simulation game, a shooter game, an action game, a card game, Mahjong, Go, Othello, a puzzle game, a quiz game, a sports game, and/or a board game, the user provides information (data) such as a clue for advantageously developing the game for the first distributor.

In the second example, by executing the installed game application and accessing the distribution server system 20A also functioning as a game server device, the first distributor terminal 11A of the first distributor can also distribute the screen of the game being executed to the terminal 10 of each viewer via the distribution server system 20A. Also in these first and second examples, the first distributor terminal 11A of the first distributor can generate the second video by using the viewing parameter received from the distribution server system 20A similarly to the various embodiments described above.

Furthermore, in the third example, the first distributor terminal 11A of the first distributor in the first example or the second example can transmit the operation data of the first distributor to the web server system 20B or the distribution server system 20A without generating a game screen. In this case, the web server system 20B or the distribution server system 20A can generate a game screen using the operation data, and the distribution server system 20A can distribute the second video including the generated game screen to the terminal 10 of each viewer. In this third example, when the web server system 20B generates a game screen, the web server system 20B can use the viewing parameter received from the distribution server system 20A. When the distribution server system 20A generates a game screen, the distribution server system 20A can use a viewing parameter managed by itself.

Thus, the technique of the present disclosure can provide a computer program, a method, and a server device that reduce the possibility of spoiling the amusement of the game. Also, the technique of the present disclosure can provide a computer program, a method, and a server device that improve the amusement by extending the mode of game distribution more than ever.

In view of the many possible embodiments to which the principles of the disclosed subject matter may be applied, it should be recognized that the illustrated embodiments are only preferred examples and should not be taken as limiting the scope of the scope of the claims to those preferred examples. Rather, the scope of the claimed subject matter is defined by the following claims. We therefore claim as our invention all that comes within the scope of these claims.

What is claimed is:

1. Computer-readable storage media storing computer-readable instructions, which when executed by a computer having at least one processor, cause the computer to:
   distribute a first video and a second video toward a viewer terminal of at least one viewer via the Internet, the first video including either video generated with motion data regarding a motion of a first distributor or an animation of an avatar of the first distributor generated on the basis of the motion data, the second video being data regarding a computer-implemented game generated on the basis of operation data regarding an operation of the first distributor using a received web page;
   determine whether or not first data has been transmitted from the first distributor;
   extract at least one other avatar on the basis of at least one of second data or third data in a case where it is determined that the first data has been transmitted from the first distributor, the second data being data regarding one or more users in a computer-implemented game performed in the past by the one or more users different from the first distributor, the third data being data regarding data transmitted from a viewer terminal of the at least one viewer; and
   perform display control of including the at least one other avatar and an avatar of the first distributor in the second video.

2. The computer-readable storage media according to claim 1, wherein the second video is a video regarding a computer-implemented game generated on the basis of operation data regarding an operation of the first distributor using received web page.

3. The computer-readable storage media according to claim 1, wherein the first distributor and a user corresponding to the at least one other avatar perform the computer-implemented game by performing display control of including the at least one other avatar and an avatar of the first distributor in the second video.

4. The computer-readable storage media according to claim 1, wherein the first data is transmitted to an external social networking service (SNS).

5. The computer-readable storage media according to claim 1, wherein the first data includes data requesting that the at least one other avatar be included in the second video together with an avatar of the first distributor.

6. The computer-readable storage media according to claim 1, wherein at least one of the second data or the third data includes data in which a priority of at least one other avatar to be included in the second video together with an avatar of the first distributor is assigned to each of the one or more users.

7. The computer-readable storage media according to claim 6, wherein a first upper limit value being a number of an upper limit of an avatar that can be included in the second video together with an avatar of the first distributor is defined and wherein the instructions further cause the computer to:
   determine whether or not first data has been transmitted from the first distributor;
   determine whether or not the number of the at least one other avatar exceeds the first upper limit value in a case where it is determined that the first data has been transmitted from the first distributor;
   determine to include an avatar of the number users equal to or less than the first upper limit value from among the at least one other avatar in the second video together with an avatar of the first distributor on the basis of at least one of the priority included in the second data or the priority included in the third data in a case where the number of the at least one other avatar is equal to or greater than the first upper limit value; and
   determine to include the at least one other avatar in the second video together with an avatar of the first distributor on the basis of at least one of the priority included in the second data or the priority included in the third data in a case where the number of the at least one other avatar is equal to or less than the first upper limit value.

8. The computer-readable storage media according to claim 7, wherein the instructions further cause the computer to:
   distribute at least any of the first video and the second video to a user corresponding to an avatar that is not included in the second video together with an avatar of the first distributor from among the at least one other avatar if the number of the at least one other avatar exceeds the first upper limit value and it is decided that an avatar of the number of people equal to or less than the first upper limit value from among the at least one other avatar are included in the second video together with an avatar of the first distributor.

9. The computer-readable storage media according to claim 1, wherein the second data includes at least one of data indicating a parameter in a computer-implemented game that at least one user of the one or more users has ever distributed or viewed in the past or data indicating a relationship between the at least one user and the first distributor.

10. The computer-readable storage media according to claim 9, wherein the second data includes at least any of the number of times of distribution of a computer-implemented game distributed in the past by the at least one user, the number of times of view of a computer-implemented game viewed in the past by the at least one user, data indicating a level of the avatar of the at least one user, data indicating a ranking of the at least one user, data indicating the number of times of distribution of the computer-implemented game distributed by the at least one user together with the first distributor in a computer-implemented game distributed in the past by the first distributor, data indicating the number of times of view of the computer-implemented game distributed in the past by the first distributor viewed by the at least one user, data indicating a history in which at least one user has belonged to an event in a computer-implemented game executed in the past by the first distributor, data indicating whether or not at least one user follows the first distributor, data indicating the total number of messages transmitted between at least one user and the first distributor, and data indicating an amount of gifts and content of the gifts given to the first distributor by at least one user in a computer-implemented game distributed in the past by the first distributor.

11. The computer-readable storage media according to claim 10, wherein the instructions further cause the computer to:
perform, on the basis of the second data, display control of including, in the second video together with an avatar of the first distributor, among avatars of the at least one user, an avatar of a user having the largest number of times of distribution of a computer-implemented game distributed in the past, an avatar of a user having the largest number of times of view of a computer-implemented game viewed in the past, an avatar of the highest level, an avatar of a user with the highest ranking, an avatar of a user having the largest number of times of distribution of, together with the first distributor, a computer-implemented game distributed in the past by the first distributor, an avatar of a user having the largest number of times of view of a computer-implemented game executed in the past by the first distributor, an avatar of a user having the largest number of belonging to events in a computer-implemented game executed in the past by the first distributor, an avatar of a user having the largest total number of messages transmitted to the first distributor and received from the first distributor, an avatar of a user having given the largest number of gifts to the first distributor, or an avatar of a user decided to have the highest accumulation of values of gifts given to the first distributor.

12. The computer-readable storage media according to claim 11, wherein the accumulation of the values of the gifts given to the first distributor is decided on the basis of the total sum of prices of gifts given to the first distributor or the total sum of consumption points consumed in the computer-implemented game.

13. The computer-readable storage media according to claim 1, wherein the third data includes data regarding a transmission timing of data transmitted from a viewer terminal of the at least one viewer.

14. The computer-readable storage media according to claim 13, wherein the instructions further cause the computer to:
perform display control of including an avatar of a user whose transmission timing is the earliest among one or more users and an avatar of the first distributor in the second video.

15. The computer-readable storage media according to claim 14, wherein an avatar to be included in the second video together with an avatar of the first distributor is changed on the basis of a change of a parameter of an avatar of the first distributor after the display control, on the basis of a change of a parameter of the at least one other avatar to be included in the second video together with an avatar of the first distributor after the display control, or on the basis of the lapse of first length of time after the display control.

16. An apparatus comprising:
a first processor including a central processing unit (CPU), a microprocessor, and/or a graphics processing unit (GPU); and
the computer-readable storage media according to claim 1, wherein that at least one process comprises the first processor.

17. The apparatus according to claim 16, wherein the first processor is mounted on a smartphone, a tablet, a mobile phone, and/or a personal computer.

18. A computer-implemented method for automatically generating customized video in an interactive network application, the method comprising:
with at least one processor:
distributing a first video and a second video toward a viewer terminal of at least one viewer via the Internet, the first video including either video generated with motion data regarding a motion of a first distributor or an animation of an avatar of the first distributor generated on the basis of the motion data, the second video being data regarding a computer-implemented game generated on the basis of operation data regarding an operation of the first distributor using a received web page;
determining whether or not first data has been transmitted from the first distributor;
extracting at least one other avatar on the basis of at least one of second data or third data in a case where it is determined that the first data has been transmitted from the first distributor, the second data being data regarding at least one user in a computer-implemented game performed in the past by the at least one user different from the first distributor, the third data being data regarding data transmitted from a viewer terminal of the at least one viewer; and
performing display control of including the at least one other avatar and an avatar of the first distributor in the second video.

19. A terminal device, comprising:
at least one processor coupled to the Internet, wherein the at least one processor is configured to:
receive a first video and a second video from a distributor terminal of a first distributor via the Internet, the first video including either motion data regarding a motion of the first distributor, the motion data being produced with a camera, or an animation of an avatar of the first distributor generated on the basis of the motion data, the second video being data regarding a computer-implemented game generated on the basis of operation data regarding an operation of the first distributor using a received web page, wherein it is determined whether or not first data has been transmitted from the first distributor, wherein at least one other avatar is extracted on the basis of at least one of second data or third data in a case where it is determined that the first data has been transmitted from the first distributor, the second data being data regarding one or more users in a computer-implemented game performed in the past by the one or more users different from the first distributor, the third data being data regarding data transmitted from a viewer terminal of at least one viewer; and receive a second video including the at least one other avatar and an avatar of the first distributor in a case where a display control to include the at least one other avatar and an avatar of the first distributor in the second video is performed.

20. A system, comprising:

the terminal device of claim 19; and a server device coupled to the distributor terminal via the Internet, wherein the server is configured to transmit the second video to the terminal device.

\* \* \* \* \*